United States Patent
Poulos et al.

(10) Patent No.: US 10,037,626 B2
(45) Date of Patent: Jul. 31, 2018

(54) INTERACTION WITH VIRTUAL OBJECTS BASED ON DETERMINED RESTRICTIONS

(71) Applicant: Microsoft Technology Licensing, LLC, Redmond, WA (US)

(72) Inventors: Adam Gabriel Poulos, Sammamish, WA (US); Cameron Graeme Brown, Bellevue, WA (US); Andrew Austin Jackson, Kirkland, WA (US); Cheyne Rory Quin Mathey-Owens, Seattle, WA (US); Michael Robert Thomas, Redmond, WA (US); Arthur Tomlin, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/199,657

(22) Filed: Jun. 30, 2016

(65) Prior Publication Data

US 2018/0005443 A1 Jan. 4, 2018

(51) Int. Cl.
*G09G 5/00* (2006.01)
*G06T 19/00* (2011.01)
*G06F 3/01* (2006.01)

(52) U.S. Cl.
CPC ............ *G06T 19/006* (2013.01); *G06F 3/017* (2013.01)

(58) Field of Classification Search
CPC ............................. G06T 19/006; G06F 3/017
USPC ........................................ 345/619, 632, 633
See application file for complete search history.

(56) References Cited

U.S. PATENT DOCUMENTS

| 8,068,095 | B2 | 11/2011 | Pryor |
| 9,230,368 | B2 | 1/2016 | Keane et al. |
| 9,261,968 | B2 | 2/2016 | Yen et al. |

(Continued)

FOREIGN PATENT DOCUMENTS

| WO | WO2004042545 | 5/2004 |
| WO | WO2007030947 | 3/2007 |
| WO | 2014073982 A1 | 5/2014 |

OTHER PUBLICATIONS

Alankus, Gazihan, "Motion-Based Video Games for Stroke Rehabilitation with Reduced Compensatory Motions", In Doctoral Dissertation of Washington University, Dec. 2011, 239 pages.

(Continued)

*Primary Examiner* — Xiao Wu
*Assistant Examiner* — Sarah Lhymn
(74) *Attorney, Agent, or Firm* — Newport IP, LLC; Jacob P. Rohwer

(57) ABSTRACT

Motion and/or rotation of an input mechanism can be tracked and/or analyzed to determine limits on a user's range of motion and/or a user's range of rotation in three-dimensional space. The user's range of motion and/or the user's range of rotation in three-dimensional space may be limited by a personal restriction for the user (e.g., a broken arm). The user's range of motion and/or the user's range of rotation in three-dimensional space may additionally or alternatively be limited by an environmental restriction (e.g., a physical object in a room). Accordingly, the techniques described herein can take steps to accommodate the personal restriction and/or the environmental restriction thereby optimizing user interactions involving the input mechanism and a virtual object.

18 Claims, 10 Drawing Sheets

(56) References Cited

U.S. PATENT DOCUMENTS

| | | | |
|---|---|---|---|
| 2009/0046140 A1* | 2/2009 | Lashmet | G09G 3/002 348/51 |
| 2009/0325705 A1 | 12/2009 | Filer et al. | |
| 2012/0157263 A1* | 6/2012 | Sivak | G06F 3/014 482/4 |
| 2012/0229381 A1 | 9/2012 | Langridge | |
| 2013/0324857 A1* | 12/2013 | Kurillo | A61B 5/1127 600/476 |
| 2013/0326364 A1 | 12/2013 | Latta et al. | |
| 2014/0347390 A1 | 11/2014 | Poulos et al. | |
| 2014/0371633 A1* | 12/2014 | Evin | G09B 5/06 600/595 |
| 2015/0035750 A1 | 2/2015 | Bailey et al. | |
| 2015/0077323 A1* | 3/2015 | Ramaswamy | G06F 3/012 345/156 |
| 2017/0154471 A1* | 6/2017 | Woo | G06T 19/006 |

OTHER PUBLICATIONS

Alankus, et al., "Towards Customizable Games for Stroke Rehabilitation", In Proceedings of the SIGCHI Conference on Human Factors in Computing Systems, Apr. 10, 2010, pp. 2113-2122.

Gerling, et al., "Is Movement Better? Comparing Sedentary and Motion-Based Game Controls for Older Adults", In Proceedings of Graphics Interface, May 29, 2013, 8 pages.

"International Search Report and Written Opinion Issued in PCT Application No. PCT/US2017/037099", dated Sep. 6, 2017, 17 Pages. (MS# 359817-WO-PCT).

* cited by examiner

700 ↘

```
┌─────────────────────────────────────────────────────────────┐
│ IDENTIFY THE LOCATION OF THE USER AND/OR THE LOCATION OF THE │
│                      INPUT MECHANISM                         │
│                           702                                │
└─────────────────────────────────────────────────────────────┘
                              │
                              ▼
┌─────────────────────────────────────────────────────────────┐
│ CREATE AND STORE AN INTERACTION PROFILE FOR THE LOCATION(S), THE │
│  INTERACTION PROFILE DEFINING A RANGE OF MOTION, A RANGE OF  │
│      ROTATION, AND/OR ADJUSTED CORRELATION PARAMETERS        │
│                           704                                │
└─────────────────────────────────────────────────────────────┘
                              │
                              ▼
┌─────────────────────────────────────────────────────────────┐
│ DETERMINE, AT A LATER TIME, THAT THE USER AND INPUT MECHANISM IS │
│                  IN SAME/SIMILAR LOCATION                    │
│                           706                                │
└─────────────────────────────────────────────────────────────┘
                              │
                              ▼
┌─────────────────────────────────────────────────────────────┐
│                   ACTIVATE INTERACTION PROFILE               │
│                           708                                │
└─────────────────────────────────────────────────────────────┘
```

FIG. 7

INTERACTION WITH VIRTUAL OBJECTS BASED ON DETERMINED RESTRICTIONS

BACKGROUND

Augmented reality (AR), virtual reality (VR), and/or mixed reality (MR) systems enable a user to interact with virtual objects presented via an interface. The interface includes virtual objects rendered and presented via a display of a head-mounted device such that the virtual objects appear to be objects in the user's real-world environment. To enable the user to interact with the interface, these types of systems can include various input mechanisms that send signals to the head-mounted device. For instance, the head-mounted device can process signals received from an input mechanism controlled by the hand of the user, and coordinate an interaction based on the processed signals (e.g., the head-mounted device may be configured to display a virtual pointer in association with a position and/or an orientation of the input mechanism).

Typically, the head-mounted device is configured to process the signals received from the input mechanism, and subsequently render and present virtual objects in the interface, in the same manner for any user wearing the head-mounted device. That is, the head-mounted device is not configured to effectively adapt the processing of the signals to accommodate, or compensate for, a user's personal restriction that limits a range of motion and/or a range of rotation of the input mechanism. For example, as part of a game, a user may point a laser emitted by an input mechanism at a virtual object and drag the virtual object from a position on one side of a room to another position on the opposite side of the room. However, the user may have a personal restriction that hinders the motion and/or the rotation required to successfully complete this interaction (e.g., a broken arm with a cast, arthritis inhibiting comfortable movement, etc.). Since the head-mounted device is unable to effectively control an interaction to accommodate the user's personal restriction, the user experience is frustrated, and it may be difficult, or even impossible, for the user to successfully drag and place the virtual object in the other position on the opposite side of the room.

Further, user-controlled motion and/or rotation of an input mechanism can also be hindered by physical objects in an environment in which the user is located. In addition to a user's personal restriction, the head-mounted device is not configured to effectively control an interaction to accommodate a physical object that impedes or prevents user-controlled motion and/or rotation of an input mechanism.

SUMMARY

This disclosure describes techniques for tracking and analyzing motion and/or rotation of an input mechanism to determine limits on a user's range of motion and/or a user's range of rotation. The user's range of motion and/or range of rotation are determined with respect to a first three-dimensional space within which the input mechanism can be moved (e.g., the input mechanism is being controlled by the user's hand then the first three-dimensional space can be an area within reach of the user). Accordingly, the user's range of motion and/or the user's range of rotation may be limited by a personal restriction for the user (e.g., a broken arm, a particular user position such as sitting down, etc.). The user's range of motion and/or the user's range of rotation may additionally or alternatively be limited by an environmental restriction (e.g., a physical object in a room that prevents movement of the input mechanism). Accordingly, the techniques described herein can take steps to accommodate and/or compensate for the personal restriction and/or the environmental restriction affecting the motion and/or rotation of the input mechanism. For example, a parameter that correlates an amount of motion and/or rotation of the input mechanism in the first three-dimensional space to an amount of motion and/or rotation of a virtual element presented in a second three-dimensional space (e.g., the view of a display) can be adjusted. In another example, virtual objects can be positioned and/or re-positioned in the second three-dimensional space so the user is able to perform more comfortable interactions.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

FIG. 7 shows operations of an example process for creating and storing an interaction profile associated with a particular location of the user so that it can be activated at a later time, the interaction profile defining a range of motion of an input mechanism, a range of rotation of an input mechanism, and/or correlation parameters.

DETAILED DESCRIPTION

Figure 1:
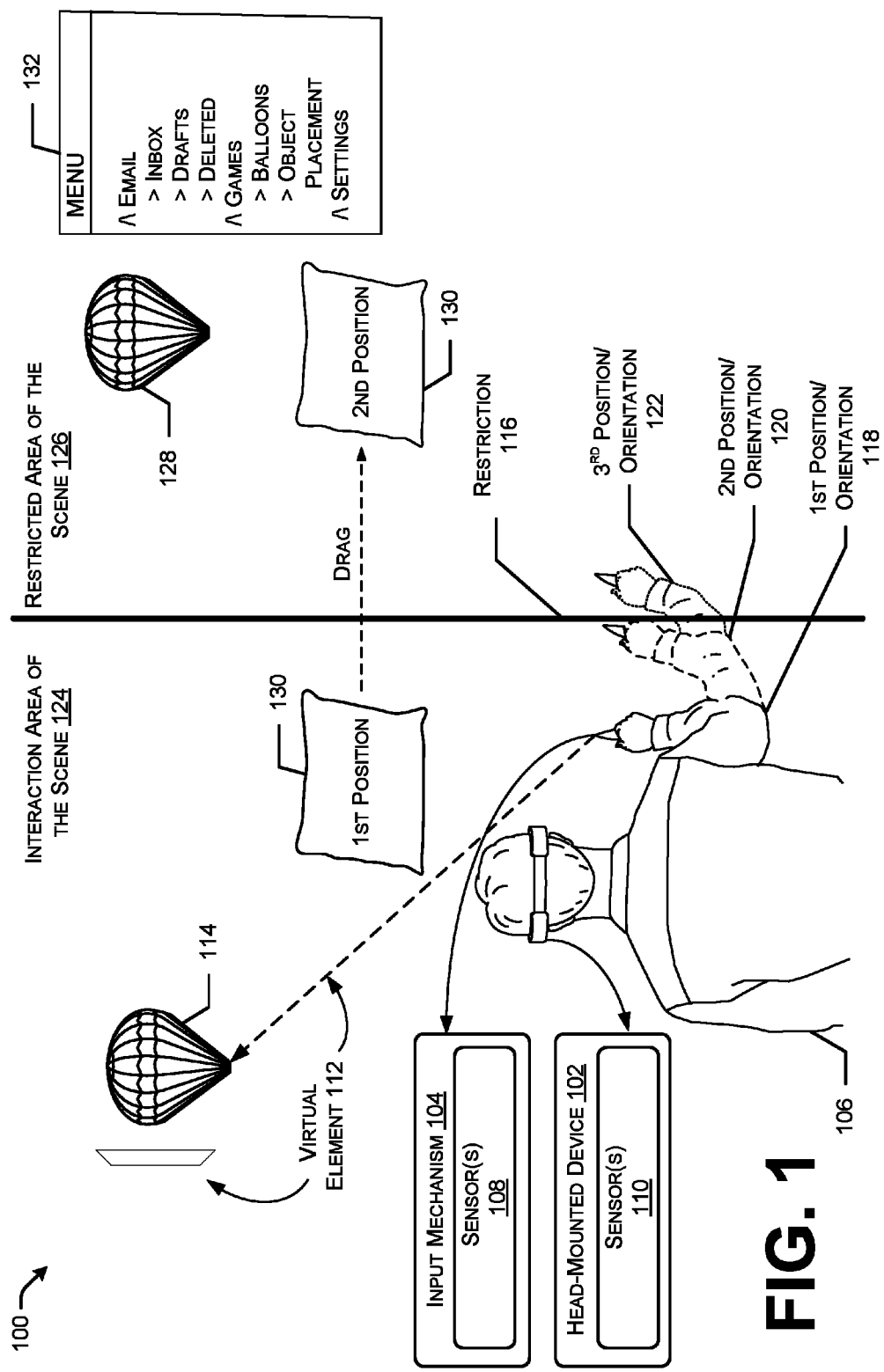
FIG. 1 is a schematic diagram showing an example environment within which (i) a restriction that limits a range of user motion and/or a range of user rotation can be determined (e.g., detected), and (ii) actions can be implemented based on the restriction to enable more comfortable user interactions and improve the user experience.

This disclosure describes techniques for tracking and analyzing motion and/or rotation of an input mechanism to determine limits on a user's range of motion and/or a user's range of rotation. The user's range of motion and/or the user's range of rotation may be limited by a personal restriction for the user. The user's range of motion and/or the user's range of rotation may additionally or alternatively be limited by an environmental restriction (e.g., a physical object in a room). Accordingly, the disclosure also describes techniques for determining a location of an environmental restriction with respect to a location of the input mechanism and/or a space in which the input mechanism can be controlled by a user (e.g., space within reach of the user). Therefore, a position and/or an orientation of the user can be taken into account when determining the location of the environmental restriction.

The personal restriction and/or the environmental restriction can limit motion and/or rotation of the input mechanism (e.g., the range of motion and/or the range of rotation of the input mechanism being handled by a user). Accordingly, the techniques described herein can take steps to accommodate and/or compensate for the personal restriction and/or the environmental restriction thereby optimizing user interactions involving the input mechanism and a virtual object.

Determination of a personal restriction can be based on an indication that a limitation in a user's range of motion and/or a user's range in rotation exists or likely exists. The motion and/or the rotation of the input mechanism can be tracked and/or determined by a computing device (e.g., a head-mounted device) from signals (e.g., data) received from the input mechanism over a period of time. The signals report a position and/or an orientation of the input mechanism at a given time based on data detected by sensors of the input mechanism. Thus, changes in position over time represent motion of the input mechanism, while changes in orientation over time represent rotation of the input mechanism. Subsequent to determining the personal restriction for the user, the techniques can adjust parameters that correlate an amount of motion and/or an amount of rotation of the input mechanism relative to an amount of motion and/or an amount of rotation of a virtual element presented on an interface, referred to herein as a "display" of an augmented reality system, virtual reality system, and/or mixed reality system. Moreover, the techniques can also position or re-position virtual objects in the display so that the virtual objects are presented in an area of a scene with which user actions are not limited by a determined range of motion and/or range of rotation (e.g., the user is capable of comfortably performing an interaction in the area without pain or difficulty). In this way, the personal restriction of the user does not affect the user's ability to comfortably complete an interaction using the input mechanism, and the user experience is improved.

As used herein, a "scene" comprises content presented in association with a display of an augmented reality system, virtual reality system, and/or mixed reality system. Therefore, a scene comprises virtual, computer-generated content (e.g., virtual objects) with which a user can interact via a virtual element under control of an input mechanism. In various examples, the scene can also comprise physical, real-world objects that surround the user in an environment and that can move in and/or out of a field of view based on movement of the head-mounted device being worn by a user and/or movement patterns of the physical, real-world objects (e.g., other people, pets, etc.).

As described above, the motion and/or the rotation of the input mechanism controls a virtual element that may be viewable by the user via the display. Consequently, the motion and/or the rotation of the input mechanism can control, or at least contribute to, an interaction between the virtual element and a virtual object presented to the user via the display (e.g., a selection of a virtual menu option). As an example, the virtual element controlled by the motion and/or the rotation of the input mechanism can be a cursor that is seen by a user on the display of a head-mounted device. In another example, the virtual element controlled by the motion and/or the rotation of the input mechanism can be a pointer that is seen by a user on the display of a head-mounted device (e.g., the appearance of a laser emitted from a tip of the input mechanism into the scene).

The techniques described herein can track and analyze the motion and/or the rotation of the input mechanism to determine that the user is having difficulty directing or moving the virtual element to a position within the scene. More generally, the techniques described herein can track and analyze the motion and/or the rotation of the input mechanism to determine that irregularities exist in association with directing the virtual element to an area within the scene, the area including the aforementioned position. For example, an analysis of the motion and/or the rotation of the input mechanism may indicate that the user has irregularly attempted the same interaction a number of times. That is, the user may repeatedly attempt to use the virtual element to move a virtual object from a first position to a second position in a scene (e.g., point at the virtual object in the first position, select the virtual object, and attempt to drag the virtual object through the scene to the second position). The user may have been unable to successfully complete such an interaction after a certain number of attempts or it may have taken the user an unusual or irregular amount of attempts (e.g., more than a threshold number such as two or three attempts) to successfully complete the interaction. Accordingly, the analysis of such motion and/or rotation of the input mechanism may indicate that the second position is in an area of the scene that is limited by the user's range of motion and/or the user's range of rotation (e.g., the user is unable to interact with virtual objects presented in the area). In another example, an analysis of the motion and/or the rotation of the input mechanism may indicate that a user has spent an extended amount of time completing an interaction, or attempting to complete the interaction (e.g., moving a virtual object from a first position to a second position in a scene). The amount of time may be deemed an extended and/or irregular amount of time when it is above a threshold amount of time. The threshold amount of time can be defined based on an expected amount of time to complete the interaction. Similarly, the analysis of such motion and/or rotation of the input mechanism may indicate that the second position is in an area of the scene that is limited by the user's range of motion and/or the user's range of rotation.

This limited range of motion (e.g., arm movement) and/or the limited range of rotation (e.g., rotation of the wrist handling the input mechanism) can be caused by a personal restriction. For instance, a broken arm can be a personal restriction that makes it impossible for a user to raise the input mechanism above the user's shoulder. Or, arthritis of an older user can be a personal restriction that makes it difficult and/or painful to perform a normal or expected range of motion and/or range of rotation. Even further, uncomfortableness or laziness can be a personal restriction (e.g., the user is reclined in a couch seat and may not want to extend his or her arm into a normal range, but rather only a limited range). Consequently, based on the determination that a personal restriction exists or likely exists, the techniques can adjust a correlation parameter that determines an amount of motion and/or an amount of rotation of the virtual element within the scene being viewed via the display relative to an amount of motion and/or an amount of rotation of the input mechanism. An amount can be a distance moved in a respective coordinate space and/or a number of degrees of rotation. Stated another way, the techniques can adjust the sensitivity of the input mechanism. As an example, if a distance (e.g., one centimeter) of actual motion of the input mechanism within a first three-dimensional coordinate space previously correlated to a first distance (e.g., one meter) of virtual motion of the virtual element within a second three-dimensional coordinate space that encapsulates the scene being viewed by the user, then the head-mounted device may adjust or change the correlation parameter based on the limited range of motion caused by the personal restriction so that the same distance (e.g., one centimeter) of actual motion of the input mechanism correlates to a second distance (e.g., two meters) of virtual motion of the virtual element within the second three-dimensional coordinate space that encapsulates the scene being viewed by the use, where the second distance is greater than the first distance (e.g., two meters is greater than one meter). In this example, the sensitivity of the input mechanism is increased so a user's limited range of motion does not restrict movement of the virtual element within the scene being viewed by the user via the display of the head-mounted device. In other words, a user's physical limited range of motion has a reduced effect on the range of motion of the virtual element viewed by the user via the display.

The input mechanism that detects and reports data on position and orientation can be a six degrees of freedom (6DoF) input mechanism (e.g., a 6DoF device). Six degrees of freedom refers to the freedom of movement of an input mechanism in three-dimensional space. That is, the input mechanism, under control of a user's arm and/or hand, for example, can (i) change position forward and backward, (ii) change position up and down, and (iii) change position left and right. Thus, the first, second, and third degrees of a 6DoF device are associated with the three perpendicular axes of the three-dimensional space. Further, the input mechanism, under control of a user's hand and/or arm, for example, can change orientation through rotation with respect to the three perpendicular axes. Thus, the fourth, fifth, and sixth degrees of a 6DoF device are associated with orientation and may be referred to as "pitch", "yaw", and "roll".

Determination of an environmental restriction can be based on a current location (e.g., position and/or orientation) of a user (e.g., a location of the user in 3-D space) with respect to the detected location of a physical object in a real-world environment. For example, if the user is sitting at a table and facing the table, then sensors of the head-mounted device and/or other devices within or around the real-world environment can determine that the table is an environmental restriction with respect to the user's current location. Stated another way, the user may be unable to perform a motion that moves the input mechanism through the table via a "smooth" motion path (e.g., an approximate straight line) from a first position above the table to a second position below the table. Rather, based on the environmental restriction such as the table, the user would inconveniently have to re-position and/or re-orient herself or himself to make it possible to move the input mechanism around the table to reach the area below the table (e.g., an irregular, curved motion path that inconveniences the user). Similar to the description above with respect to the personal restriction, subsequent to determining the environmental restriction, the techniques can adjust a correlation parameter that determines an amount of motion and/or an amount of rotation of the virtual element within the scene being viewed via the display relative to an amount of motion and/or an amount of rotation of the input mechanism. Moreover, the techniques can also position or re-position virtual objects in a display so that the virtual objects are presented in an area of a scene within which user interactions are not limited by the determined range of motion and/or range of rotation (e.g., an area within which the he user is capable of comfortably interacting). In this way, the environmental restriction does not affect the user's ability to comfortably complete an interaction using the input mechanism, and the user experience is improved.

In some examples, the techniques described herein can be performed in whole or in part using a head-mounted device (e.g., OCULUS RIFT by OCULUS VR, GOOGLE GLASS by GOOGLE INC., HOLOLENS by MICROSOFT CORPORATION, HTC VIVE, etc.). The head-mounted device may include one or more displays to display virtual content (e.g., a virtual object such as a rendered holographic image), one or more onboard processors and memory, while in other examples, the head-mounted device may be communicatively coupled (wired or wireless) to one or more remote processing and/or memory resources. In other examples, the techniques described herein can be implemented using a game console or other device in communication with a depth camera (e.g., KINECT by MICROSOFT CORPORATION, etc.).

FIG. 1 is a schematic diagram showing an example environment 100 within which a restriction that limits a range of user motion and/or a range of user rotation can be determined (e.g., detected), and actions can be implemented based on the restriction to enable more comfortable user interactions and improve the user experience. The example environment 100 includes a head-mounted device 102 and an input mechanism 104 associated with a user 106. The head-mounted device 102, details of which are further described herein with respect to FIGS. 2, 3, 8, 9, and/or 10, is configured to be placed (e.g., mounted) on the head of the user 106. As described above, the input mechanism 104 is configured to detect and report, to the head-mounted device 102, data indicative of a position and/or an orientation of the input mechanism 104 (e.g., as the position and/or orientation changes over time). The input mechanism 104 is configured to be moved and/or rotated within a first three-dimensional coordinate space recognizable by the head-mounted device 102 or other devices. For instance, the first three-dimensional space may be associated with (e.g., model) an area within reach of the user's 106 arm or hand, in an event the input mechanism 104 is being handled by the user 106.

Therefore, the input mechanism 104 includes sensors 108 to collect the position and/or the orientation data. In various examples described herein, the input mechanism 104 includes a six degrees of freedom (6DoF) device configured to be controlled by the arm and/or hand of the user 106. However, in other examples, the input mechanism 104 can be the same (e.g., 6DoF device) or another type of input device configured to be controlled by other parts of the user 106, such as a device configured to be strapped to or around an ankle of the user 106 that tracks the position and/or the orientation of a foot and/or a leg of the user 106. The head-mounted device 102 can also include sensors 110. The sensors 110 can be outward facing sensors configured to detect positioning data associated with locations of physical objects in a real-world environment (e.g., a table, a chair, a wall, etc.) such that the head-mounted device 102 or another network device can build a model of a physical environment in which the user is located (e.g., a room, an office, etc.). Outward facing sensors can also detect physical characteristics of the user 106 (e.g., hand and/or arm position) and use the physical characteristics detected to determine position and/or orientation data of the hand. Thus, in some instances, the hand can be an input mechanism from which data associated with position and/or orientation can be detected (e.g., by the head-mounted device). Moreover, the sensors 110 can be inward facing sensors configured to detect eye gaze, which can contribute to the identification of a target virtual object to which the user's gaze is directed.

As described above, the motion and/or the rotation of the input mechanism 104 can control a virtual element viewable by the user 106 via a display, and therefore, can also control an interaction between the virtual element and a virtual object presented in a scene being viewed by the user 106 via the display. In some instances, the virtual element may not be viewable on the display (e.g., an invisible laser pointer). The head-mounted device 102 is configured to implement a change in position and/or a change in orientation of the virtual element within the display relative to a change in position and/or a change in orientation of the input mechanism 104. That is, the head-mounted device 102 is configured to convert signals representative of motion and/or rotation of the input mechanism 104 in a first three-dimensional space (e.g., space within reach of the user's 106 arm handling the input mechanism 104) into corresponding motion and/or rotation of the virtual element in a second three-dimensional space (e.g., the scene being viewed by the user via the display). In various implementations, the second three-dimensional space is larger, or appears to be larger, than the first three-dimensional space.

FIG. 1 illustrates examples of a virtual element 112 viewable via the display of the head-mounted device 102 (e.g., the illustrated cursor or the illustrated laser pointer). In FIG. 1, the virtual element 112 is being directed to a virtual object (e.g., a virtual balloon 114 presented on the display of the head-mounted device 102). Consequently, the motion and/or the rotation of the input mechanism 104 contributes to, and/or controls, an interaction between the virtual element 112 and a virtual object presented to the user 106 via the display.

FIG. 1 further illustrates a restriction 116 that limits motion and/or rotation of the input mechanism 104. For instance, the user 106 may be able to move and/or rotate the input mechanism 104 from a first position and/or orientation 118 to a second position and/or orientation 120 (e.g., by moving and/or rotating an arm and/or hand), but the user 106 may be limited when moving and/or rotating the input mechanism 104 from the second position and/or orientation 120 to a third position and/or orientation 122 due to the restriction 116. The limitation of the user 106 may represent a strict inability such that it is physically impossible for the user to move the input mechanism 104 to the third position and/or orientation 122 (e.g., a physical object such as a bookshelf may physically prevent the motion and/or rotation). Alternatively, the limitation of the user 106 may represent a level of uncomfortableness for the user 106, such that it may be physically possible for the user 106 to move the input mechanism 104 to the third position and/or orientation 122, but doing so would be uncomfortable for the user (e.g., cause the user pain, inconvenience the user, etc.). The level of uncomfortableness can be signaled by, or correspond to, a number of repeated attempts to perform an interaction and/or an amount of time to perform an interaction (e.g., an extended amount of time that is greater than a threshold established based on an expected amount of time).

The restriction 116 can comprise a personal restriction or an environmental restriction, as described above. For example, a personal physical condition (e.g., a temporary broken arm, permanent arthritis, etc.) can prevent the user 106 from, or at least make it very difficult and/or uncomfortable for the user 106 to, move and/or rotate the input mechanism 104 from the second position and/or orientation 120 to the third position and/or orientation 122. In another example, a physical object in the user's environment (e.g., a table in a room) can prevent the user 106 from, or at least make it very difficult and/or uncomfortable for the user 106 to, move and/or rotate the input mechanism 104 from the second position and/or orientation 120 to the third position and/or orientation 122. Accordingly, the head-mounted device 102 can track motion and/or rotation of the input mechanism 104 over time, and build, based on the tracked motion and/or rotation, a model indicative of a user's 106 range of motion and/or range of rotation in a first three-dimensional space. The user's 106 range of motion and/or range of rotation can be determined based on limitations caused by the restriction 116. In various examples, the model can be mapped to another three-dimensional space (e.g., the scene being viewed by the user on a display) to distinguish between (i) an interaction area of a scene 124 within which user interaction based on motion and/or rotation of the input mechanism 104 is possible, comfortable, and/or not limited by the restriction 116 and (ii) a restricted area of a scene 126 within which user interaction based on motion and/or rotation of the input mechanism 104 is impossible, uncomfortable, and/or limited by the restriction 116. Consequently, the restriction 116 can be used to determine the interaction area of the scene 124 and/or the restricted area of the scene 126.

As an example, the head-mounted device 102 or other network devices configured within or around the user's 106 real-world environment can be configured to determine that that the user 106 is not limited when moving and/or rotating the input mechanism 104 so that the virtual element 112 points at the virtual balloon 114, but that the user 106 is limited when moving and/or rotating the input mechanism 104 so that the virtual element 112 points at the other virtual balloon 128 illustrated in FIG. 1. In another example, the head-mounted device 102 or other network devices configured within or around the user's 106 real-world environment can be configured to determine that the user 106 is limited when moving and/or rotating the input mechanism 104 so that the virtual element 112 drags a virtual pillow 130 from a first position in the interaction area of the scene 124 to a second position in the restricted area of the scene 126. The user 106 may be performing the action of dragging and placing the pillow 130 while designing or decorating a room using a virtual design/decorating application.

In yet another example, the head-mounted device 102 or other network devices configured within or around the user's 106 real-world environment can be configured to determine that the user 106 is limited when moving and/or rotating the input mechanism 104 so that the virtual element 112 can make a selection in a virtual menu 132 displayed in the restricted area of the scene 126. In various examples, the virtual menu 132 can be configured in a default position that is locked to the edge of the user's peripheral view so it does not interfere with other interactions being performed by the user 106, and the virtual menu 132 may be configured to float around as the user's field of view changes (e.g., due to movement of the user's 106 body or head).

Subsequent to determining the restriction 116 and identifying the restricted area of the scene 126 with respect to a user's 106 current position and/or current orientation, the head-mounted device 102 or other network devices configured within or around the user's real-world environment can implement actions to compensate for the restriction 116 and to enable possible and more comfortable user interactions.

In a first implementation, a correlation parameter can be adjusted to compensate for the restriction 116 (e.g., a personal restriction, an environmental restriction) and to enable the user 106 to more comfortably interact with virtual objects in the restricted area of the scene 126. For instance, the sensitivity of the input mechanism 104 can be adjusted so that an amount of motion and/or rotation of the input mechanism 104 correlates to an increased amount of motion and/or rotation of the virtual element 112 (e.g., increased with respect to a previous or default amount of motion and/or rotation of the virtual element). Thus, if movement of the virtual pillow 130 from the first position in the interaction area of the scene 124 to the second position in the restricted area of the scene 126 previously required the user 106 to move the input mechanism 104 from the first position and/or orientation 118 to the third position and/or orientation 122 (e.g., a first required distance), then the correlation parameter can be adjusted so that movement of the virtual pillow 130 from the first position in the interaction area of the scene 124 to the second position in the restricted area of the scene 126 can be achieved when the user 106 moves the input mechanism 104 from the first position and/or orientation 118 to the second position and/or orientation 120 (e.g., a second required distance that is less than the first required distance). Based on the decreased amount of motion of the input mechanism 104 that is required, the user 106 is enabled to successfully place the virtual pillow 130 in the second position that previously was part of the "restricted" area of the scene 126 prior to the adjustment of the correlation parameter. Stated another way, by adjusting the correlation parameter, the restriction 116 no longer applies and the interaction area of the scene 124 is expanded and/or the restricted area of the scene is eliminated. Consequently, the determined limits on the range of motion and/or range of rotation of the input mechanism 104 have a lessened effect on the user experience with respect to the scene being viewed via the display.

In various examples, the correlation parameter can be used to convert data from a first coordinate space (e.g., a 3-D space of an area within reach of the user and within which the input mechanism 104 can be moved) to a second coordinate space (e.g., a 3-D space of a scene presented on a display). Thus, the techniques can determine an amount (e.g., a distance) of virtual element 112 motion and/or an amount of virtual element 112 rotation in the second coordinate space relative to changes in position and/or orientation of the input mechanism 104 within the first coordinate space. For instance, the correlation parameter can initially be set to a default value (e.g., a 1:1 ratio indicating that 1 centimeter of input mechanism motion represents one meter of virtual element motion in a particular dimension), which can subsequently be adjusted (e.g., to a 1:2 ratio indicating that 1 centimeter of input mechanism motion represents two or three meters of virtual element motion in the particular dimension). By changing the sensitivity of the input mechanism 104 via changing the correlation parameter, the user's 106 limited range of motion and/or limited range of rotation due to the restriction 116 (e.g., a broken arm, sore joints, physical objects, etc.) does not restrict motion and/or rotation of the virtual element 112 within the scene being viewed by the user via the display of the head-mounted device 102.

In a second implementation, the head-mounted device 102 can position or re-position a virtual object that is typically presented on the display in the restricted area of the scene 126 so that it is presented in the interaction area of the scene 124. This can also accommodate the user's 106 limited range of motion and/or range of rotation caused by the restriction 116. For example, the default position for the virtual menu 132 can be changed from the position shown in FIG. 1 (in the restricted area of the scene 126) to the interaction area of the scene 124. In another example, the head-mounted device 102 can be configured, as part of a balloon popping game, to only present balloons in the interaction area of the scene 124 (e.g., virtual balloon 114) and to not present balloons in the restricted area of the scene 126 (e.g., virtual balloon 128).

Figure 2:
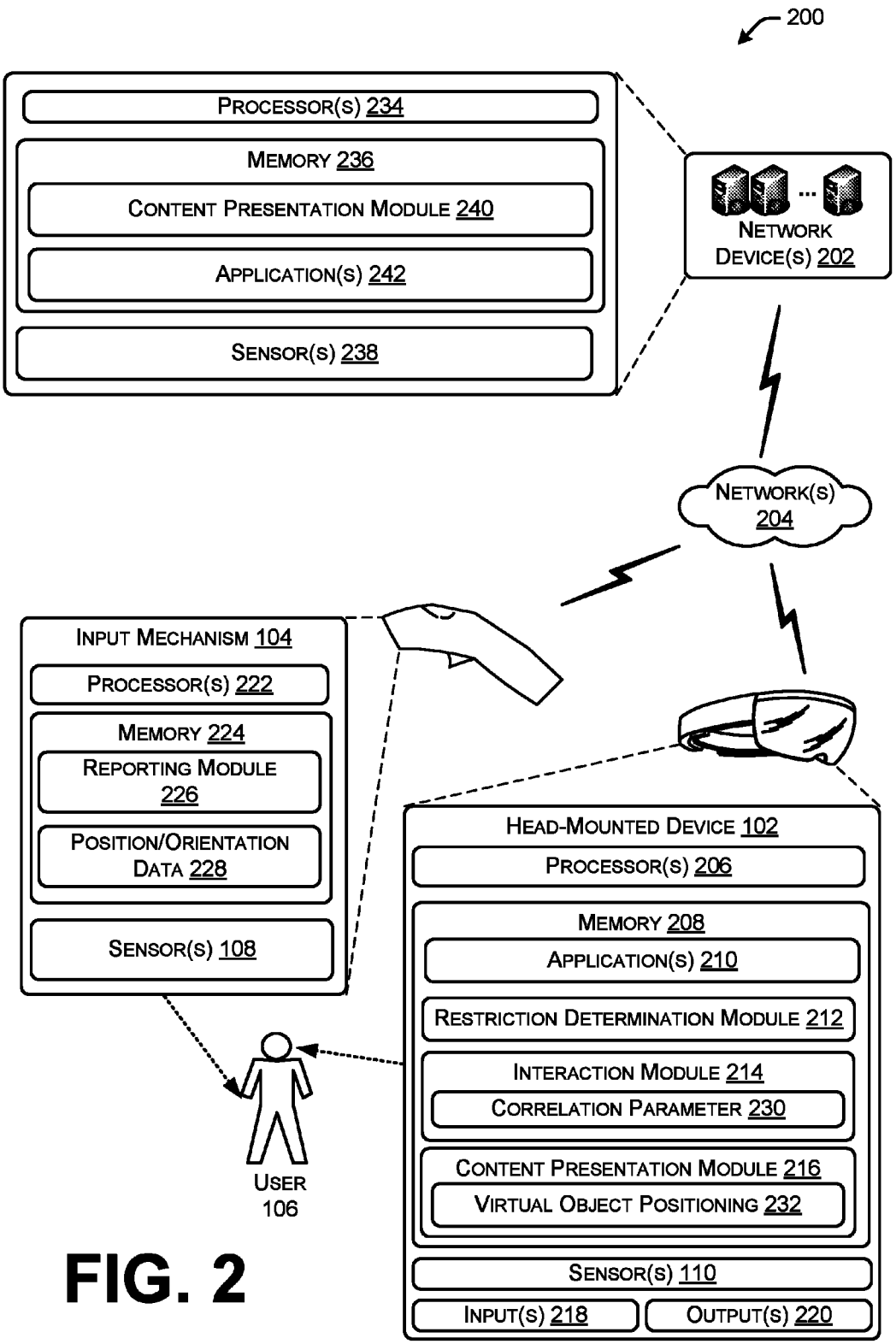
FIG. 2 is a schematic diagram showing an example computing and networking environment within which (i) a restriction that limits a range of user motion and/or a range of user rotation can be determined (e.g., detected), and (ii) actions can be implemented based on the restriction to enable more comfortable user interactions and improve the user experience.

FIG. 2 is a schematic diagram showing an example computing and networking environment 200 within which (i) a restriction that limits a range of user motion and/or a range of user rotation can be determined (e.g., detected), and (ii) actions can be implemented based on the restriction to enable more comfortable user interactions and improve the user experience. The environment 200 includes the head-mounted device 102, the input mechanism 104, and network device(s) 202, each configured to communicate over network(s) 204. While the examples provided herein are described with respect to a head-mounted device 102, it is understood in the context of this document that the techniques can be implemented by other computing devices as well, including but not limited to a laptop computer, a tablet computer, another type of wearable device, a gaming device, and so forth. Moreover, the display can be part of the computing device or a peripheral display coupled to the computing device.

In various implementations, the network(s) 204 can be any type of wired and/or wireless networks known in the art. Moreover, the devices (e.g., the head-mounted device 102, the input mechanism 104, the network device(s) 202) can communicatively couple to the network(s) 204 in any manner, such as by a wired or wireless connection (e.g., Wi-Fi, Bluetooth, cellular data connection, Ethernet, etc.).

The head-mounted device 102 can include one or more processing unit(s) (e.g., processor(s) 206), computer-readable media such as memory 208, and one or more sensors 110 (e.g., image sensors, depth sensors, gaze tracking sensors, etc.). Processor(s) 206 can represent, for example, a CPU-type processing unit, a GPU-type processing unit, a HPU-type processing unit, a field-programmable gate array (FPGA), another class of digital signal processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-On-a-Chip systems (SOCs), Complex Programmable Logic Devices (CPLDs), etc. In various examples, the processor(s) 206 can execute one or more instructions, modules, and/or processes to cause the head-mounted device 102 to perform a variety of functions, such as those described herein. Additionally, each of the processor(s) 206 can possess its own local memory, which also can store program modules, program data, and/or one or more operating systems.

The memory 208 may include one or more applications 210, such as an operating system, a browser, a gaming application, or the like. The operating system can be configured to manage hardware and services within and coupled to the head-mounted device 102 for the benefit of other components and/or modules. The memory 208 also includes a restriction determination module 212, an interaction module 214, and a content presentation module 216, each of which are further described herein. In various examples, a module can represent pieces of code executing on a computing device (e.g., the head-mounted device 102). In some examples, individual modules can include an interface, such as an Application Program Interface (API), to perform some or all of its functionality (e.g., operations). In additional and/or alternative examples, a module can be implemented as computer-readable instructions, data structures, and so forth that are executable by at least one processing unit (e.g., processor(s) 206) to configure the device to perform the operations described herein. Functionality to perform these operations can be implemented by a single device (e.g., the head-mounted device 102) or distributed across multiple devices (e.g., the head-mounted device 102 and a network device 202).

The sensor(s) 110 can be any device or combination of devices configured to sense conditions of a user or surroundings of the user. For instance, the sensor(s) 110 can include one or more outwardly facing cameras or other sensors for capturing images of real-world objects and surroundings of the user (e.g., physical objects in the user's 106 environment). The sensor(s) 110 can additionally and/or alternatively include a depth map sensor, a light field sensor, a gyroscope, a sonar sensor, an infrared sensor, a compass, an accelerometer, a global positioning system (GPS) sensor, and/or any other device or sensing means for detecting and/or collecting position and/or orientation data of the head-mounted device 102 and/or other physical objects located around the head-mounted device 102.

The head-mounted device 102 can also include input(s) 218 (e.g., input interface(s)) and output(s) 220 (e.g., output interface(s)). At least one input 218 can be configured to receive data and/or instructions from the input mechanism 104 (e.g., a 6DoF device). Additionally, and by way of example and not limitation, the input(s) 218 can include a keyboard, a keypad, a mouse, a microphone, a touch sensor, a touch screen, a joystick, physical and/or soft control buttons, a scrolling button, a camera, a neural interface, or any other device or component suitable to generate a signal and/or data defining a user interaction with the head-mounted device 102. By way of example and not limitation, the output(s) 220 can include a display (e.g., a holographic display, a head-up display, a projector, a touch screen, a liquid crystal display (LCD), or other means for displaying, etc.), speakers, haptic interfaces, or the like.

In at least one example, an output 220 can be a hardware display surface that can be configured to allow for a real-world view of a real-world object through the hardware display surface while also providing a rendered display of computer generated content. The hardware display surface can include one or more components, such as a projector, screen, or other suitable components for producing a display of an object and/or data. In some configurations, the hardware display surface can be configured to cover at least one eye of a user 106. In other configurations, the hardware display surface can include a screen configured to cover both eyes of a user 106. The hardware display surface can render or cause the display of computer generated virtual objects (e.g., an image). For illustrative purposes, an object can be an item, data, device, person, place, or any type of entity. In at least one example, an object can be associated with a function or a feature associated with a system or an application (e.g., the menu 132 in FIG. 1).

Some configurations described herein provide both a "see through display" and an "augmented reality display." For illustrative purposes, the "see through display" can include a transparent lens that can have content displayed on it. The "augmented reality display" can include an opaque display that is configured to display content over a rendering of an image, which can be from any source, such as a video feed from a camera used to capture images of an environment. In addition, some examples described herein describe techniques that display rendered content over a "see through display" enabling a user to see a real-world view of an object with the content. It can be appreciated that the examples of the techniques described herein can apply to a "see through display," an "augmented reality display," or variations and combinations thereof.

In various implementations, the input mechanism 104 can also comprise one or more processor(s) 222 and memory 224, example of which are provided above with respect to processor(s) 206 and memory 208. Further examples of processors and computer-readable media (e.g., memory) are described below with respect to any one of FIGS. 8, 9, and/or 10. The memory 224 includes a reporting module 226 configured to send, to the head-mounted device 102 over a period of time, position and/or orientation data 228 of the input mechanism 104. The position and/or orientation data 228 of the input mechanism 104 can be detected by sensor(s) 108. The position and/or orientation data 228 can be stored locally at the input mechanism and/or can be provided (e.g., reported) to the head-mounted device 102 via the network(s) 204 (e.g., in real-time or close to real-time). To this end, sensor(s) 108 enable the collection and/or generation of data defining a position and an orientation of the input mechanism 104. For instance, sensor(s) 108 can include a gyroscope, an accelerometer, a depth map sensor, a light field sensor, an inertia sensor, a sonar sensor, an infrared sensor, a compass, a global positioning system (GPS) sensor, and/or any other sensor or sensing means for detecting and/or collecting position and/or orientation data of the input mechanism 104.

The restriction determination module 212 is configured to track and analyze the position and/or orientation data received from the input mechanism 104 to determine a range of motion and/or a range of rotation for the input mechanism 104 (e.g., for the user 106) based on various restrictions 116. The restriction determination module 212 can use the determined range of motion and/or range of rotation of the input mechanism 104 to determine an interaction area of the scene 124 presented on a display of the head-mounted device 102 and/or the restricted area of the scene 126 presented on the display of the head-mounted device 102. For example, the restriction determination module 212 can build a model of the determined range of motion and/or range of rotation of the input mechanism 104 in a first three-dimensional space. The restriction determination module 212 can then use the model to map the determined range of motion and/or range of rotation of the input mechanism 104 to a second three-dimensional coordinate space associated with the display so that an interaction area of the scene 124 and the restricted area 126 of the scene being viewed can be defined in the second-three dimensional space. In the interaction area of the scene 124, an interaction with a virtual object based on motion and/or rotation of the input mechanism 104 is not limited by the determined range of motion and/or the range of rotation of the input mechanism 104. In the restricted area of the scene 126, an interaction with a virtual object based on motion and/or rotation of the input mechanism 104 is limited by the determined range of motion and/or the range of rotation of the input mechanism 104.

In various implementations, the analysis of the position and/or orientation data may reveal a position at which the arm stops or slows motion (e.g., indicating that the user is uncomfortable moving the arm further). In another example, the analysis may reveal an orientation in which the hand/wrist stops or slows rotation (e.g., indicating that the user is uncomfortable rotating the hand/wrist further). In yet another example, the analysis may reveal irregular motion and/or rotation (e.g., zig zag or curved motion paths that clearly avoid an area in 3-D space instead of direct or straight line motion paths between a first position and a second position in the 3-D space).

In some examples, the analysis may reveal a number of times that the user 106 attempts to perform an interaction (e.g., particular motion and/or rotation of the input mechanism 104 to select a target object) in a given period of time before the interaction is successfully completed or before the user 106 gives up and stops attempting to perform the interaction. The restriction determination module 212 can determine the number of times (i.e., the number of attempts) based on identifying changes in direction of motion and/or rotation (e.g., front/back, left/right, up/down, etc.) and/or identifying repeated motion and/or rotation. The restriction determination module 212 can compare the number of times to a threshold number (e.g., two attempts, three attempts, four attempts, etc.), and if the threshold is exceeded, the restriction determination module 212 can determine that particular motion and/or rotation (e.g., particular positions and/or orientations in a 3-D coordinate space) required to perform the interaction is limited due to an existence, or likely existence, of a restriction 116 (e.g., a broken arm, a physical object, etc.).

In further examples, the analysis may reveal an amount of time the user 106 has spent attempting to perform an interaction before the interaction is successfully completed or before the user 106 gives up and stops attempting to perform the interaction. The time can be determined based on timestamps associated with particular positions and/or orientations of the input mechanism 104 received at the head-mounted device 102 over a period of time. Consequently, the restriction determination module 212 can determine that the user 106 is taking longer than usual by comparing the amount of time to a threshold amount of time (e.g., three seconds, five seconds, ten seconds, etc.) and if the threshold is exceeded, the restriction determination module 212 can determine that particular motion and/or rotation (e.g., particular positions and/or orientations in a 3-D coordinate space) required to perform the interaction is limited due to an existence, or likely existence, of a restriction 116 (e.g., a broken arm, a physical object, etc.).

By analyzing the position and/or orientation data of the input mechanism 104, the restriction determination module 212 can determine positions and/or orientations in a first coordinate space (e.g., a 3-D space within reach of the user 106) that are not being utilized, or at the least, are being utilized but not successfully (e.g., due to pain or uncomfortableness the user 106 is having a difficult time completing an interaction). The restriction determination module 212 can then build, based on the analysis, a model indicative of a user's acceptable range of motion and/or acceptable range of rotation so that problem positions and/or orientations can be avoided. In various implementations, the model is mapped to another space (e.g., 3-D space of the scene being viewed by the user on a display) to distinguish between (i) an interaction area of a scene 124 within which user interaction based on motion and/or rotation of the input mechanism 104 is possible, comfortable, and/or not limited and (ii) a restricted area of a scene 126 within which user interaction based on motion and/or rotation of the input mechanism 104 is impossible, uncomfortable, and/or limited. In some examples, various areas of the scene may be non-continuous based on the determined range of motion and/or range of rotation of the input mechanism 104 such that there are a number of segmented interaction areas and/or restricted areas (e.g., pockets of areas).

The restriction determination module 212 is also configured to determine environmental restrictions when building the model and determining the interaction area of the scene 124 and/or the restricted area of the scene 126. For instance, the sensors 110 and/or the sensors 238 can detect data useable to locate physical objects. Based on a location and/or orientation of the user 106, a physical object can be identified as an environmental restriction that prevents or hinders motion and/or rotation of the input mechanism 104 within a three-dimensional space (e.g., space within reach of the user 106). Accordingly, the model can include locations of physical objects that have the capability to affect (e.g., impede, hinder, etc.) motion and/or rotation of the input mechanism 104.

In various implementations, the interaction module 214 is configured to adjust a correlation parameter 230 that controls an amount of motion and/or rotation of the virtual element 112 relative to an amount of motion and/or rotation of the input mechanism 104. As described above, the correlation parameter 230 can be adjusted so that a same or a decreased amount of motion by the input mechanism 104 (e.g., arm movement) results in an increased amount of virtual motion by the virtual element 112 in a scene being viewed by the user. Moreover, the correlation parameter 230 can be adjusted so that a same or a decreased amount of rotation by the input mechanism 104 (e.g., wrist rotation) results in an increased amount of virtual rotation by the virtual element 112 in a scene being viewed by the user. This adjusts the sensitivity of the input mechanism 104 so that a user 106 can comfortably and successfully perform an interaction in an area of a scene that was previously restricted due to a user's limited range of motion and/or limited range of rotation (e.g., the restricted area of the scene 126).

The content presentation module 216 is configured to render and present virtual content on the display, in accordance with functions/services of the applications 210. In some implementations, the content presentation module 216 is configured to position or re-position virtual objects 232 in a scene being presented on a display so that the virtual objects are presented in the area of a scene with which the user is capable of comfortably interacting (e.g., the interaction area of the scene 124). For example, the virtual menu 132 in FIG. 1 can be re-positioned so that it is in the interaction area of the scene 124. In another example, virtual balloons can be initially positioned or re-positioned so they are located in the interaction area of the scene 124 and not the restricted area of the scene 126.

In various examples, the network device(s) 202 may be part of a service provider, and can be arranged in a data center or a server farm. Additionally or alternatively, the network device(s) 202 can be implemented in a distributed computing environment, with portions of a service running on the network devices 202 (e.g., a game console) which are in communication with the head-mounted device 102. The network device(s) 202 can also include processor(s) 234, memory 236, and/or sensor(s) 238, examples of which are provided above with respect to processor(s) 206, memory 208, and sensors 108 and 110. The memory 236 can include a content presentation module 240 and application(s) 242. The content presentation module 240 is configured to render and present computer generated content (e.g., a virtual object) on the display of the head-mounted device 102, in accordance with applications 242 (e.g., a service being performed). For example, the service may comprise a shopping service, a gaming service, a mail service, a social networking service, or the like.

In various examples, the content presentation module 240 on the network device 202 can also include, or at least interact with, a restriction determination module (e.g., similar to the restriction determination module 212) and/or an interaction module (e.g., similar to the interaction module 214) to perform aspects of the techniques described above. An application may correspond to an application stored in whole on the head-mounted device 102 or stored in part on the head-mounted device 102 and a network device 202. By way of example and not limitation, an application can include a gaming application, a file sharing application, a browser application, a search application, a productivity application (e.g., a word processing application, a spreadsheet application, a computer-aided design application, etc.), a communication application (e.g., email, instant messaging, audio and/or video conferencing, a social networking application, etc.).

Figure 3:
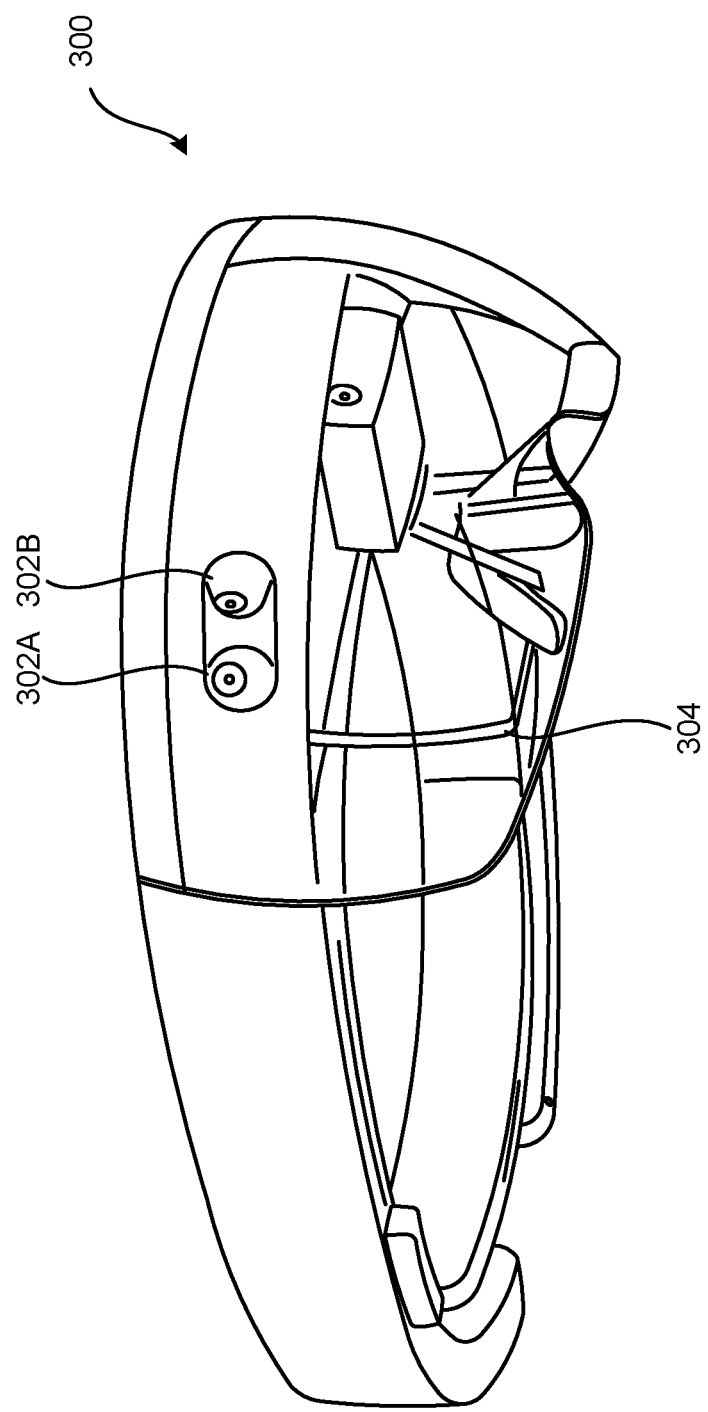
FIG. 3 is a schematic diagram showing an example configuration for a head-mounted device that can be used to implement aspects of the techniques described herein.

FIG. 3 is a schematic of diagram showing an example configuration for a head-mounted device 300 that can be used to implement aspects of the techniques described herein. In various examples, the head-mounted device 300 can correspond to the head-mounted device 102. As described above, the various technologies disclosed herein can be implemented by or in conjunction with such a head-mounted device 300 in order to modify aspects of the operation of the head-mounted device 300 based upon determined personal and/or environmental restrictions, and the determination of interaction and/or restricted areas. In order to provide this functionality, and other types of functionality, the head-mounted device 300 can include one or more sensors 302A and 302B and a display 304. The sensors 302A and 302B can include tracking sensors including, but not limited to, depth cameras and/or sensors, inertial sensors, and optical sensors.

In some examples, the sensors 302A and 302B are mounted on the head-mounted device 300 in order to capture information from a first person perspective (e.g., from the perspective of the wearer of the head-mounted device 300).

Figure 4:
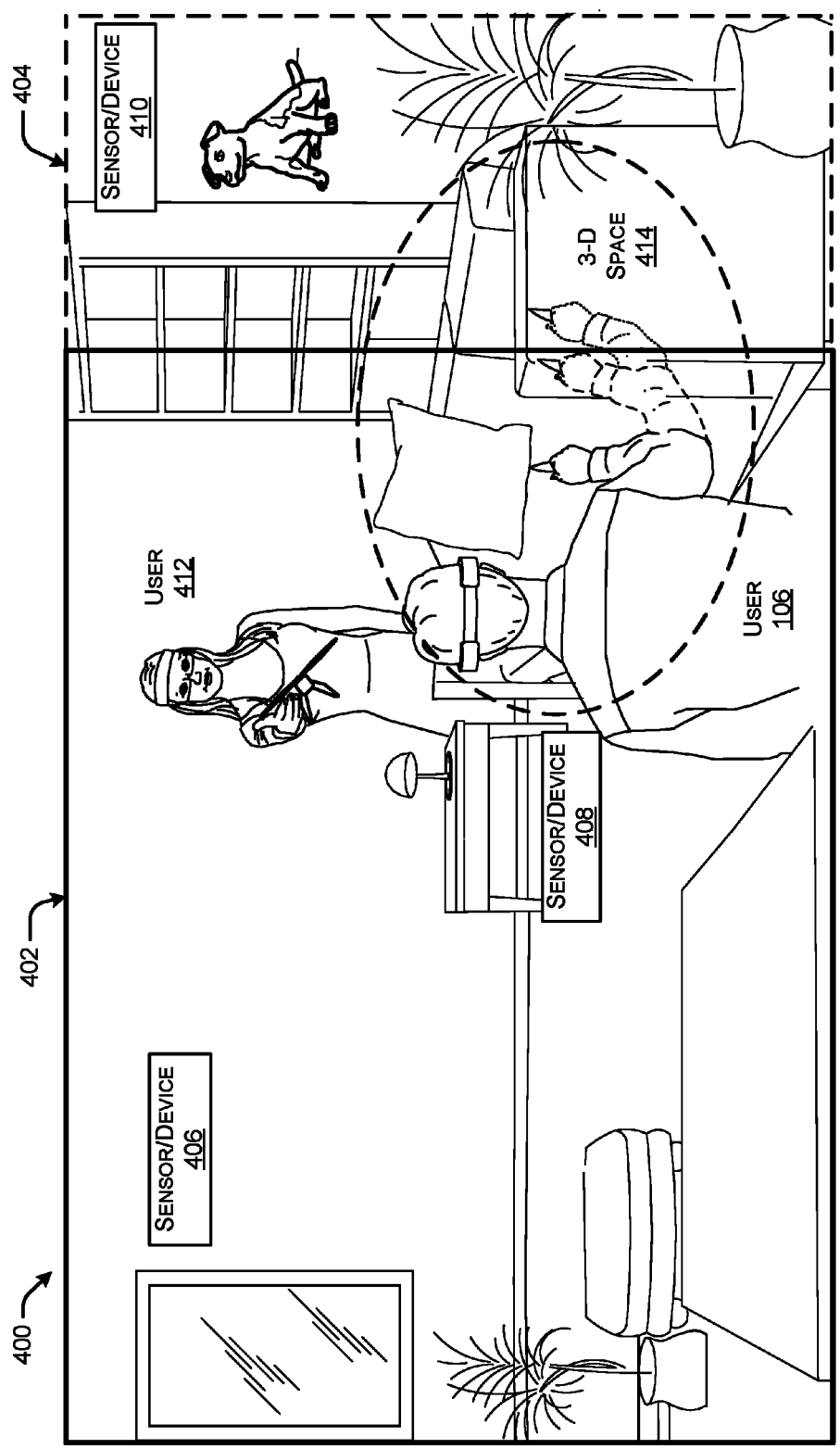
FIG. 4 is a schematic diagram showing another example environment within which a user's range of motion and/or range of rotation is limited by a restriction.

In additional or alternative examples, the sensors 302A and 302B can be external to the head-mounted device 300. In such examples, the sensors 302A and 302B can be arranged within a scene (e.g., placed in various positions throughout the room) and associated with the head-mounted device 300 in order to capture information from a third person perspective. FIG. 4 illustrates an example where sensors are arranged within a scene, and the head-mounted device 300 is configured to use information detected by the sensors to perform aspects of the techniques described herein.

The display 304 can present visual content to the wearer (e.g., the user 106) of the head-mounted device 300. In some examples, the display 304 can present visual content to augment the wearer's view of their actual surroundings in a spatial region that occupies an area that is substantially coextensive with the wearer's actual field of vision. In other examples, the display 304 can present content to augment the wearer's surroundings in a spatial region that occupies a lesser portion the wearer's actual field of vision. The display 304 can include a transparent display that enables the wearer to view both the visual content and the actual surroundings of the wearer simultaneously.

Transparent displays can include optical see-through displays where the user sees their actual surroundings directly, video see-through displays where the user observes their surroundings in a video image acquired from a mounted camera, and other types of transparent displays. The display 304 can present the visual content (which might be referred to herein as a "hologram") to a user such that the visual content augments the user's view of their actual surroundings within the spatial region.

The visual content provided by the head-mounted device 300 can appear differently based on a user's perspective and/or the location of the head-mounted device 500. For instance, the size of the presented visual content can be different based on the proximity of the user to the content. The sensors 302A and 302B can be utilized to determine the proximity of the user to real world objects and, correspondingly, to visual content (e.g., virtual objects) presented on the display 304 by the head-mounted device 300.

Additionally or alternatively, the shape of the content presented by the head-mounted device 300 on the display 304 can be different based on the vantage point of the wearer and/or the head-mounted device 300. For instance, visual content presented on the display 304 can have one shape when the wearer of the head-mounted device 300 is looking at the content straight on, but might have a different shape when the wearer is looking at the content from the side.

FIG. 4 is a schematic diagram showing another example environment 400 within which a user's 106 range of motion and/or range of rotation is limited by a restriction. In the example environment 400, the scene being viewed by the user 106 is a combination of an interaction area 402 and a restricted area 404. Thus, a three-dimensional space in which a virtual element, under control of the head-mounted device 102 and/or the input mechanism 104, can be moved or rotated is associated with what is in the view of the user (e.g., the room captured by the interaction area 402 and the restricted area 404).

FIG. 4 also illustrates one or more sensors and/or devices 406, 408, 410 (e.g., a network device 202) positioned in the user's environment (e.g., the room) to detect physical objects, such as the other user 412 interacting with the user 106, the table, the couch, and so forth. As shown in FIG. 4, the head-mounted device 102 is configured to recognize a first three-dimensional coordinate space 414 in which the input mechanism 104 can be moved and/or rotated (e.g., space within reach of the user 106). Moreover, the head-mounted device 102 is configured to convert signals representative of motion and/or rotation of the input mechanism 104 in the first three-dimensional coordinate space 414 into corresponding motion and/or rotation of a virtual element in a second three-dimensional coordinate space associated with the scene being viewed. In the example environment 400, the head-mounted device 102 and/or the sensors and/or devices 406, 408, 410 can determine that the location of the couch (e.g., the end of the couch) limits the user's 106 range of motion and/or range of rotation (e.g., the user is unable to move and/or rotate the input mechanism 104 through the end of the couch). Consequently, the head-mounted device 102 or another device can determine and model the user's limited range of motion and/or range of rotation due to the restriction (e.g., the couch), and subsequently, can determine the interaction area 402 (e.g., the user is able to comfortably interact with the helicopter) and the restricted area 404 (e.g., the user is unable to comfortably interact with the dog).

The processes described in FIGS. 5-7 below are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 5:
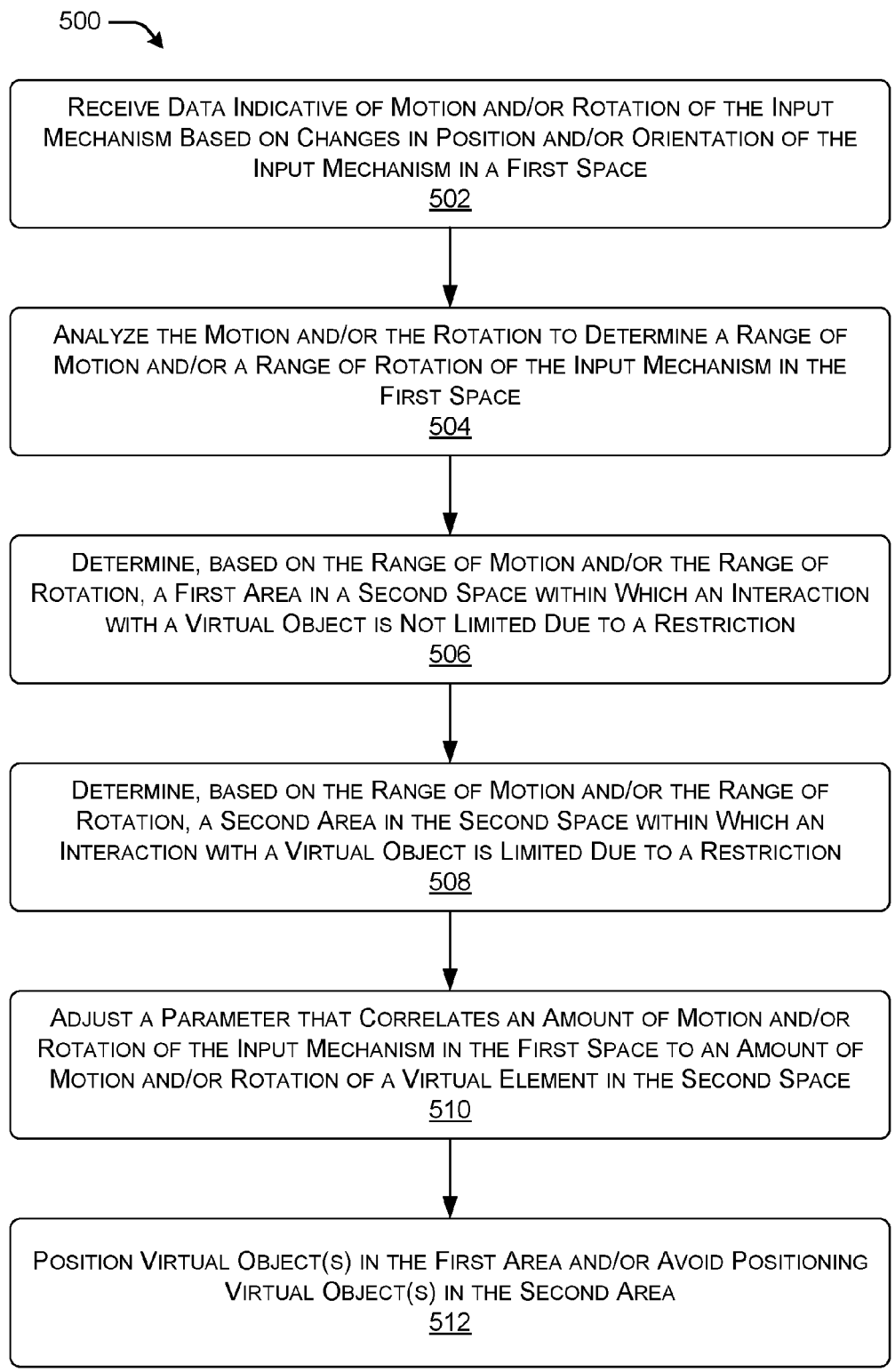
FIG. 5 shows operations of an example process for tracking and analyzing motion and/or rotation of an input mechanism to determine (i) a first area of a scene being viewed by a user within which a user interaction with a virtual object is not limited by a determined range of motion and/or a determined range of rotation and (ii) a second area of the scene within which a user interaction with a virtual object is limited by a determined range of motion and/or a determined range of rotation.

FIG. 5 shows operations of an example process 500 for tracking and analyzing motion and/or rotation of an input mechanism to determine (i) a first area of a scene being viewed by a user within which a user interaction with a virtual object is not limited by a determined range of motion and/or a determined range of rotation and (ii) a second area of the scene within which a user interaction with a virtual object is limited by a determined range of motion and/or a determined range of rotation. The example process 500 may be implemented by the head-mounted device 102 and/or a network device 202, as described above with respect to any one of FIGS. 1-4. However, the example process 500 may be implemented by other devices and/or in other environments as well.

At 502, data indicative of motion and/or rotation of an input mechanism is received (e.g., over a period of time). The motion and/or rotation of the input mechanism is based on changes in position and/or orientation of the input mechanism in a first-three dimensional coordinate space (e.g., a space within reach of a user's arm/hand), as described above.

At 504, the data is analyzed to determine a range of motion and/or a range of rotation of the input mechanism in the first three-dimensional space (e.g., the user's range of motion and/or range of rotation). As described above, the analysis can indicate a repeated number of attempts to perform the same interaction (e.g., in a given period of time) and/or an extended amount of time to perform an individual interaction (e.g., a time period longer than an expected time period). In some examples, a model of the range of motion and/or a range of rotation of the input mechanism in the first three-dimensional space can be built.

At 506, a first area in a second three-dimensional coordinate space is determined based on the determined range of motion and/or the determined range of rotation. For instance, the first area can comprise an interaction area within which an interaction with a virtual object is not limited due to a restriction.

At 508, a second area in the second three-dimensional coordinate space is determined based on the determined range of motion and/or the determined range of rotation. For instance, the second area can comprise a restricted area within which an interaction with a virtual object is limited due to a restriction. The limitation can be associated a difficulty (e.g., likely user pain due to a personal restriction) or an impossibility to perform the interaction.

In various implementations, at 510, a parameter that correlates an amount of motion and/or an amount of rotation of the input mechanism in the first three-dimensional space to an amount of motion and/or an amount of rotation of a virtual element displayed in the second three-dimensional space is adjusted. Using the adjusted parameter and based on further data received from the input mechanism, the virtual element presented on the display can be controlled so that an interaction with a virtual object presented in the first area of the display can be performed because the area is no longer restricted due to the adjusted parameter.

In additional or alternative implementations, at 512, virtual objects can be positioned or re-positioned in the first area so that difficult or impossible interactions with virtual objects positioned in the second area are no longer required.

Figure 6:
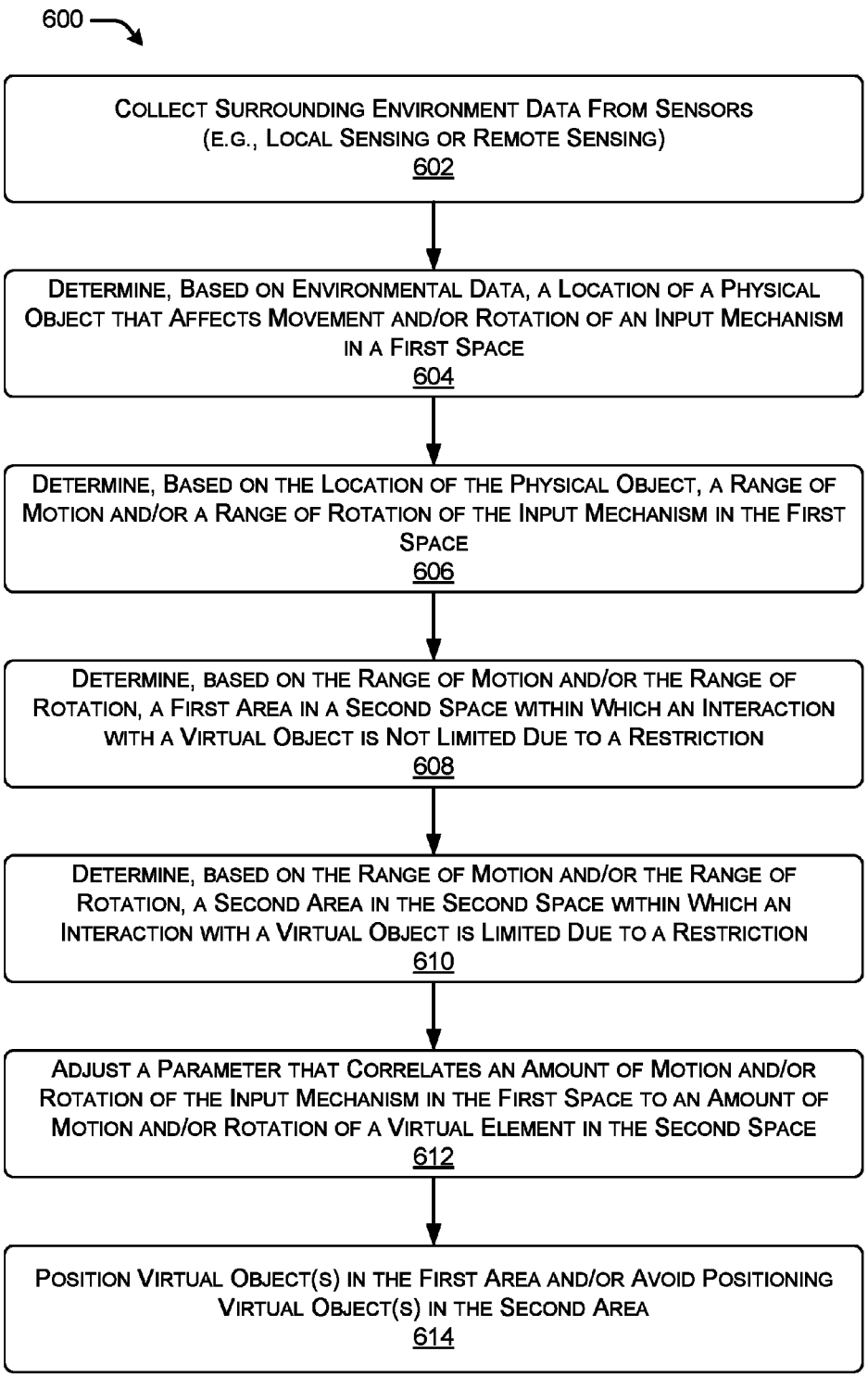
FIG. 6 shows operations of an example process for determining a location of a physical object in a surrounding environment of a user and using the location to determine (i) a first area of a scene being viewed by a user within which a user interaction with a virtual object is not limited by a determined range of motion and/or a determined range of rotation and (ii) a second area of the scene within which a user interaction with a virtual object is limited by a determined range of motion and/or a determined range of rotation.

FIG. 6 shows operations of an example process for determining a location of a physical object in a surrounding environment of a user and using the location to determine (i) a first area of a scene being viewed by a user within which a user interaction with a virtual object is not limited by a determined range of motion and/or a determined range of rotation and (ii) a second area of the scene within which a user interaction with a virtual object is limited by a determined range of motion and/or a determined range of rotation. The example process 600 may be implemented by the head-mounted device 102 and/or a network device 202, as described above with respect to any one of FIGS. 1-4. However, the example process 600 may be implemented by other devices and in other environments as well.

At 602, real-world environmental data is collected by sensors (e.g., sensors configured locally within the head-mounted device and/or sensors configured remotely within the surrounding environment).

At 604, a location of a physical object is determined based on the environmental data. As described above, the location can be determined to be a potential hindrance to motion and/or rotation of the input mechanism in a first three-dimensional coordinate space (e.g., the physical object is located within reach of the user).

At 606, the location of the physical object is used to determine a range of motion and/or a range of rotation of the input mechanism in the first three-dimensional space (e.g., the user's range of motion and/or range of rotation). In some examples, a model of the range of motion and/or a range of rotation of the input mechanism in the first three-dimensional space can be built.

At 608, a first area in a second three-dimensional coordinate space is determined based on the determined range of motion and/or the determined range of rotation. For instance, the first area can comprise an interaction area within which an interaction with a virtual object is not limited due to a restriction.

At 610, a second area in the second three-dimensional coordinate space is determined based on the determined range of motion and/or the determined range of rotation. For instance, the second area can comprise a restricted area within which an interaction with a virtual object is limited due to a restriction.

In various implementations, at 612, a parameter that correlates an amount of motion and/or an amount of rotation of the input mechanism in the first three-dimensional space to an amount of motion and/or an amount of rotation of a virtual element displayed in the second three-dimensional space is adjusted. Using the adjusted parameter and based on data received from the input mechanism, the virtual element presented on the display can be controlled so that an interaction with a virtual object presented in the first area of the display can be performed because the area is no longer restricted due to the adjusted parameter.

In additional or alternative implementations, at 614, virtual objects can be positioned or re-positioned in the first area so that interactions with virtual objects positioned in the second area are no longer required.

FIG. 7 shows operations of an example process 700 for creating and storing an interaction profile associated with a particular location of the user so that it can be activated at a later time, the interaction profile defining a range of motion of an input mechanism, a range of rotation of an input mechanism, and/or correlation parameters. The example process 700 may be implemented by the head-mounted device 102 and/or a network device 202, as described above with respect to any one of FIGS. 1-4. However, the example process 700 may be implemented by other devices and in other environments as well.

At 702, the location of the user and/or the location (e.g., the first three-dimensional space within reach of the user) of the input mechanism is identified. For example, the location may comprise a particular position of the user (e.g., sitting in a reclined position on the couch while performing more relaxing interactions, standing in a room while engaged in more active interactions related to an exercise application, etc.).

At 704, an interaction profile for the location(s) is created and stored. The interaction profile can define information associated with the determined range of motion in a first three-dimensional space, the determined range of rotation in a first three-dimensional space, the location of physical objects surrounding the user, the adjusted correlated parameter, the interaction area in a second three-dimensional space, and/or the restricted area in a second three-dimensional space. This information can be determined via the aspects described above (e.g., in accordance with the example processes 500 and/or 600).

At 706, it is determined, at a later time, that the user and/or the input mechanism have returned to the same or similar location(s) identified in operation 702.

At 708, the interaction profile is activated. That is, the head-mounted device can be configured to display virtual content and/or perform interactions using the information retained in the interaction profile. The interaction profile can be activated and used automatically (e.g., without user input) or in response to a user command.

The example process 700 can be implemented to improve user comfort and/or the user experience (e.g., a virtual reality gaming experience) when the user is in a particular location (e.g., position and/or orientation). For example, a player that typically sits and reclines on his or her own couch to play a particular game is more likely to make smaller, limited motions compared to when the user stands and plays the game because less joints are freely available to contribute to motions while sitting and reclining. Moreover, the typical spot on the couch where the player sits may be adjacent to known physical objects that do not move, and thus, will always be hindrance to movement.

In various implementations, the head-mounted device provides the user with an opportunity to enable or disable a mode that implements the adjustment of a correlation parameter and/or the positioning of virtual objects in the interaction area (e.g., and not the restricted area). Accordingly, such a mode can be communicated to the player as an activated accessibility mode that can be turned off if the user does not prefer to have the interaction assistance (e.g., the user can enable the mode/feature on while sitting in a reclined position on the couch and the user can disable the mode/feature while standing).

In various examples, an interaction profile can comprise information created for a specific user, as well as information created for multiple users (e.g., location specific information). For instance, the user-specific information can result in modifications to that specific user's range of motion and/or rotation (e.g. Alice has a broken arm which does not affect the experience Bob has when he uses Alice's head-mounted device). The other information can be based on a system's understanding of potential environment hazards (e.g., an environmental restriction) that can affect any user's range of motion and/or rotation, and thus, this system-level profile information can be used for any user of any head-mounted device in a particular location or position (e.g., sitting on a particular seat on the edge of a couch that is adjacent to a wall that restricts motion).

Figure 8:
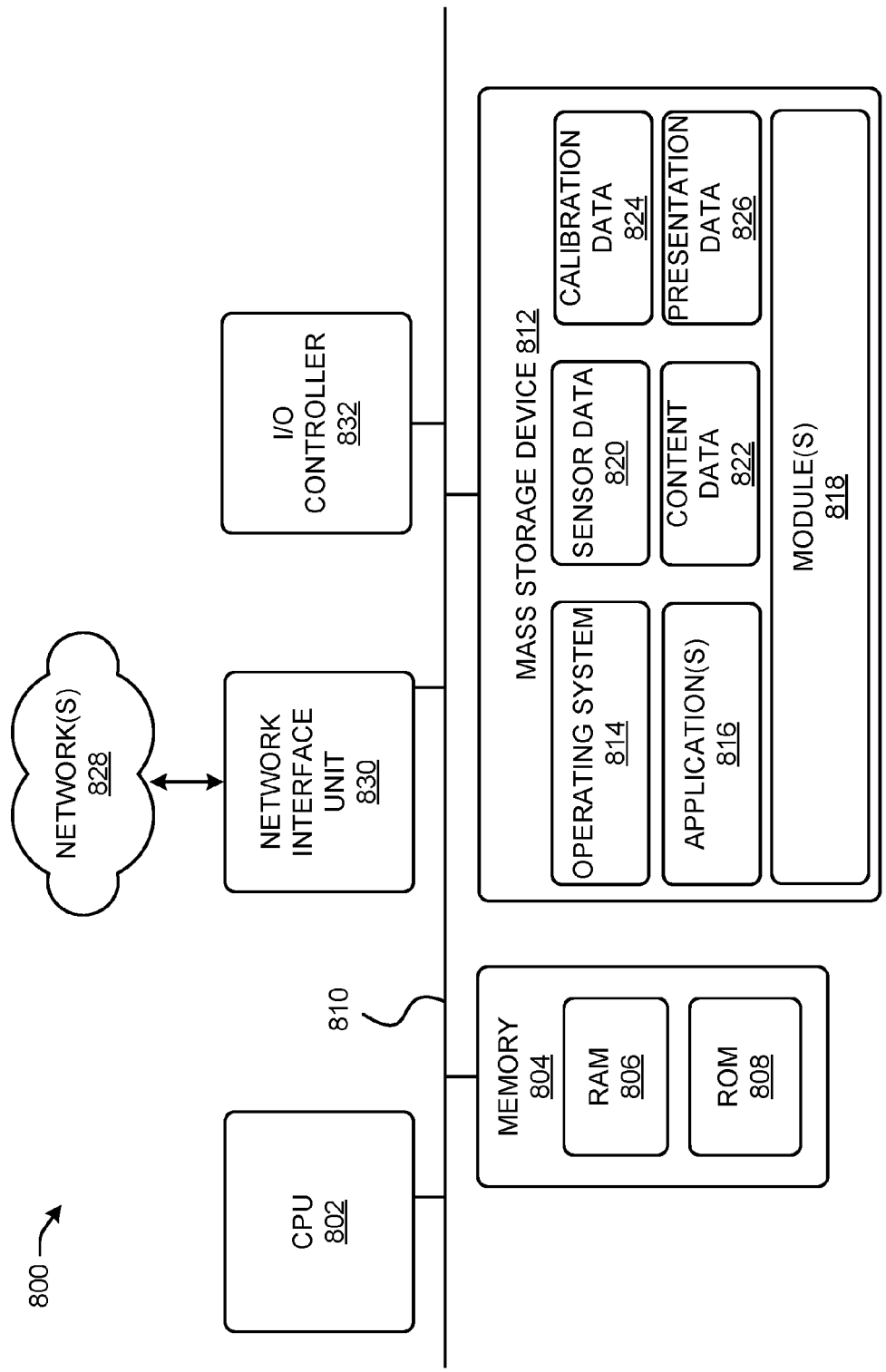
FIG. 8 shows details of an example computing device architecture for a computing device, such as a head-mounted device, capable of executing aspects of the techniques described herein.

FIG. 8 shows details of an example computer architecture 800 for a computing device, such as head-mounted device 102 or networking device 202, capable of executing aspects of the techniques described above. Thus, the computer architecture 800 illustrated in FIG. 8 illustrates an architecture for a server computer, a mobile phone, a PDA, a smart phone, a desktop computer, a netbook computer, a tablet computer, a laptop computer, a wearable computer, a game console, or other computing device. The computer architecture 800 is an example architecture that can be used to execute, in whole or in part, aspects of the software components presented herein.

The computer architecture 800 illustrated in FIG. 8 includes a central processing unit 802 ("CPU"), a system memory 804, including a random access memory 806 ("RAM") and a read-only memory ("ROM") 808, and a system bus 810 that couples the memory 804 to the CPU 802. A basic input/output system ("BIOS") containing the basic routines that help to transfer information between elements within the computer architecture 1300, such as during startup, is stored in the ROM 808. The computer architecture 800 further includes a mass storage device 812 for storing an operating system 814, application(s) 816 (e.g., application(s) 210 and/or 242, etc.), module(s) 818 (e.g., any of the modules illustrated in FIG. 2), and the like. Additionally and/or alternatively, the mass storage device 812 can store sensor data 820 (e.g., from sensors 108, 110, 238, etc.), content data 822 (e.g., photographs, computer generated images, object information about real and/or virtual objects in a scene, metadata about any of the foregoing, etc.), calibration data 824, presentation data 826 (e.g., instructions, prompts, etc.), and the like, as described herein.

The mass storage device 812 is connected to the CPU 802 through a mass storage controller connected to the bus 810. The mass storage device 812 and its associated computer-readable media provide non-volatile storage for the computer architecture 800. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of communication media.

By way of example, and not limitation, computer storage media can include volatile and non-volatile, removable and non-removable media implemented in any method or technology for storage of information such as computer-readable instructions, data structures, program modules or other data. For example, computer storage media includes, but is not limited to, RAM, ROM, erasable programmable read-only memory ("EPROM"), electrically erasable programmable read-only memory ("EEPROM"), flash memory or other solid state memory technology, compact disc read-only memory ("CD-ROM"), digital versatile disks ("DVD"), high definition/density digital versatile/video disc ("HD-DVD"), BLU-RAY disc, or other optical storage, magnetic cassettes, magnetic tape, magnetic disk storage or other magnetic storage devices, or any other medium which can be used to store the desired information and which can be accessed by the computer architecture 800. For purposes of the claims, the phrase "computer storage medium," "computer-readable storage medium," and variations thereof, does not include communication media.

According to various configurations, the computer architecture 800 can operate in a networked environment using logical connections to remote computers through the network(s) 828. The computer architecture 800 can connect to the network 828 through a network interface unit 830 connected to the bus 810. It should be appreciated that the network interface unit 830 also can be utilized to connect to various types of networks and remote computer systems. The computer architecture 800 also can include an input/output controller 832 for receiving and processing input from an input device (e.g., an input mechanism 104) or an input interface, and to provide output to an output device or an output interface. Numerous examples of input and output devices and interfaces are described herein.

It should be appreciated that the software components described herein can, when loaded into the CPU 802 and executed, transform the CPU 802 and the overall computer architecture 800 from a general-purpose computing system into a special-purpose computing system customized to facilitate the functionality presented herein. The CPU 802 can be constructed from any number of transistors or other discrete circuit elements, which can individually or collectively assume any number of states. More specifically, the CPU 802 can operate as a finite-state machine, in response to executable instructions contained within the software modules described herein. These computer-executable instructions can transform the CPU 802 by specifying how the CPU 802 transitions between states, thereby transforming the transistors or other discrete hardware elements constituting the CPU 802. In some examples, processor(s) 206, processor(s) 222, and/or processor(s) 234 can correspond to CPU 802.

Encoding the software modules presented herein also can transform the physical structure of the computer-readable media presented herein. The specific transformation of physical structure can depend on various factors, in different implementations of this description. Examples of such factors can include, but are not limited to, the technology used to implement the computer-readable media, whether the computer-readable media is characterized as primary or secondary storage, and the like. For example, if the computer-readable media is implemented as semiconductor-based memory, the software described herein can be encoded on the computer-readable media by transforming the physical state of the semiconductor memory. For example, the software can transform the state of transistors, capacitors, or other discrete circuit elements constituting the semiconductor memory. The software also can transform the physical state of such components in order to store data thereupon.

As another example, the computer-readable media described herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations also can include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 800 in order to store and execute the software components presented herein. It also should be appreciated that the computer architecture 800 can include various types of computing entities, including hand-held computers, embedded computer systems, personal digital assistants, and other types of computing entities known to those skilled in the art.

Figure 9:
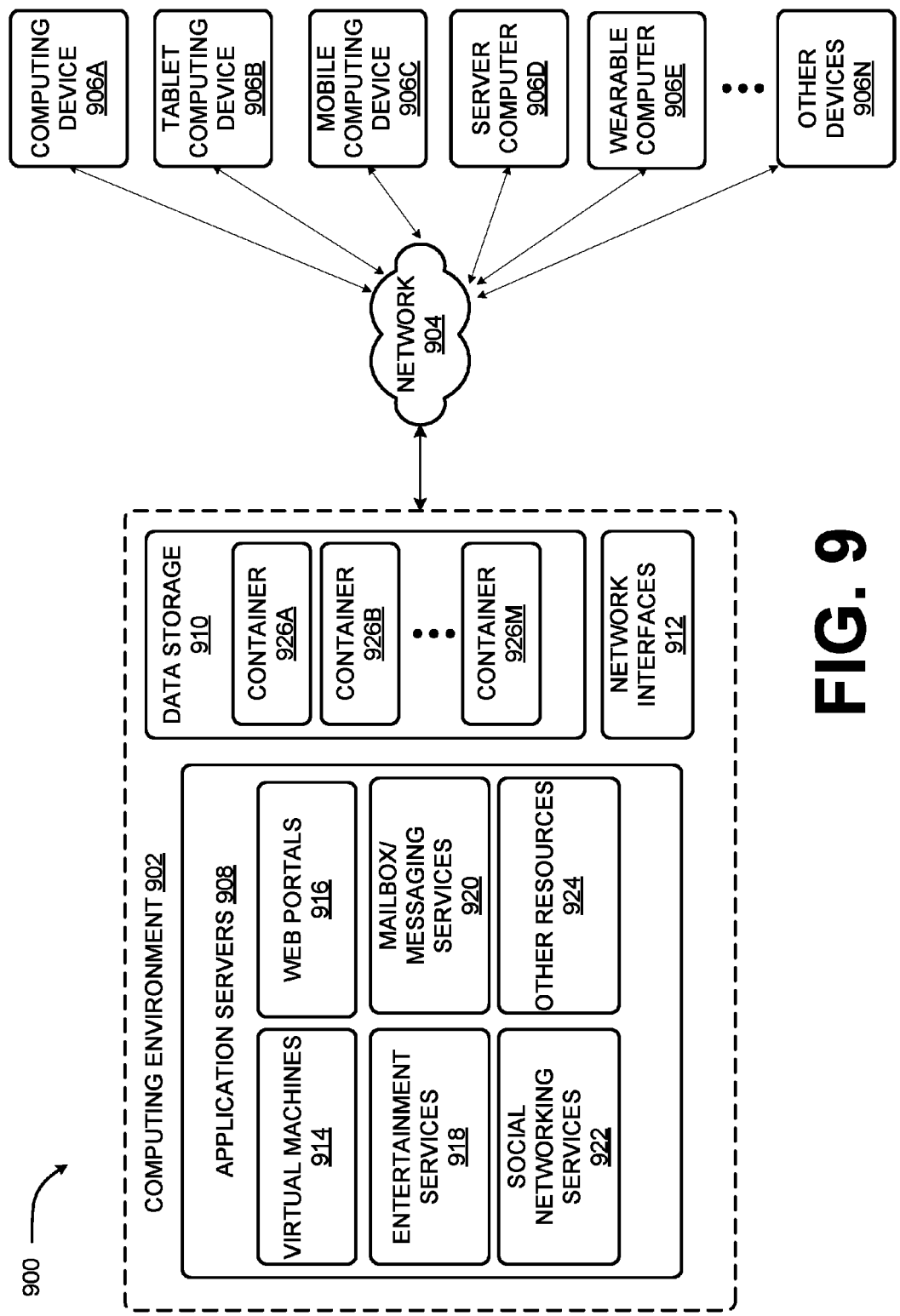
FIG. 9 shows details of an example distributed computing environment capable of executing aspects of the techniques described herein.

FIG. 9 shows details of an example distributed computing environment 900 capable of executing aspects of the techniques described herein. According to various implementations, the distributed computing environment 900 includes a computing environment 902 operating on, in communication with, or as part of a network 904. In at least one example, at least some of computing environment 902 can correspond to the head-mounted device 102, a network device, or other computing device. The network 904 can be or can include network(s) 204 and/or network(s) 828, described above with reference to FIGS. 2 and 8, respectively. The network 904 also can include various access networks. One or more client devices 906A-906N (hereinafter referred to collectively and/or generically as "clients 906") can communicate with the computing environment 902 via the network 904 and/or other connections (not illustrated in FIG. 9). N may be any integer greater than or equal to 1 depending on the desired architecture. In one illustrated configuration, the clients 906 include a computing device 906A such as a laptop computer, a desktop computer, or other computing device, a slate or tablet computing device ("tablet computing device") 906B, a mobile computing device 906C such as a mobile telephone, a smart phone, or other mobile computing device, a server computer 906D, a wearable computer 906E, and/or other devices 906N. It should be understood that any number of clients 906 can communicate with the computing environment 902. An example computing architecture for the clients 906 is illustrated and described herein with reference to FIG. 8. It should be understood that the illustrated clients 906 and computing architectures illustrated and described herein are illustrative, and should not be construed as being limited in any way.

In the illustrated configuration, the computing environment 902 includes application servers 908, data storage 910, and one or more network interfaces 912. According to various implementations, the functionality of the application servers 908 can be provided by one or more server computers that are executing as part of, or in communication with, the network 904. In some examples, the computing environment 902 can correspond to or be representative of the network devices 202 in FIG. 2, which are in communication with and accessible by the one or more computing devices (e.g., the head-mounted device 102) via the network(s) 204 and/or 904.

In at least one example, the application servers 908 can host various services, virtual machines, portals, and/or other resources. In the illustrated configuration, the application servers 908 can host one or more virtual machines 914 for executing applications or other functionality. The application servers 908 also host or provide access to one or more portals, link pages, Web sites, and/or other information ("Web portals") 916. The Web portals 916 can be used to communicate with one or more client computers. The application servers 908 can include one or more entertainment services 918. The entertainment services 918 can include various gaming experiences for one or more users.

According to various implementations, the application servers 908 also include one or more mailbox and/or messaging services 920. The mailbox and/or messaging services 920 can include electronic mail ("email") services, various personal information management ("PIM") services (e.g., calendar services, contact management services, collaboration services, etc.), instant messaging services, chat services, forum services, and/or other communication services.

The application servers 908 also can include one or more social networking services 922. The social networking services 922 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 922 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 922 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from MICROSOFT CORPORATION in Redmond, Wash. Other services are possible and are contemplated.

The social networking services 922 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 922 are not mentioned herein for the sake of brevity. As such, the above configurations are illustrative, and should not be construed as being limited in any way. According to various implementations, the social networking services 922 can provide a source of images, video, audio, or other content to be presented or output (e.g., via a head-mounted device).

As shown in FIG. 9, the application servers 908 also can host other services, applications, portals, and/or other resources ("other resources") 924. The other resources 924 can deploy a service-oriented architecture or any other client-server management software. It thus can be appreciated that the computing environment 902 can provide integration of the techniques described herein with various mailbox, messaging, social networking, and/or other services or resources.

As mentioned above, the computing environment 902 can include the data storage 910. According to various implementations, the functionality of the data storage 910 is provided by one or more databases operating on, or in communication with, the network 904. The functionality of the data storage 910 also can be provided by one or more server computers configured to host data for the computing environment 902. The data storage 910 can include, host, or provide one or more real or virtual containers 926A-926M (referred to collectively and/or generically as "containers 926"). Although not illustrated in FIG. 9, the containers 926 also can host or store data structures and/or algorithms for execution by one or more modules of remote computing devices. Aspects of the containers 926 can be associated with a database program, file system and/or any program that stores data with secure access features. Aspects of the containers 926 can also be implemented using products or services, such as ACTIVE DIRECTORY, DKM, ONEDRIVE, DROPBOX or GOOGLEDRIVE.

The computing environment 902 can communicate with, or be accessed by, the network interfaces 912. The network interfaces 912 can include various types of network hardware and software for supporting communications between two or more computing entities including, but not limited to, the clients 906 and the application servers 908. It should be appreciated that the network interfaces 912 also can be utilized to connect to other types of networks and/or computer systems.

It should be understood that the distributed computing environment 900 described herein can provide any aspects of the software elements described herein with any number of virtual computing resources and/or other distributed computing functionality that can be configured to execute any aspects of the software components described herein. According to various implementations of the concepts and technologies described herein, the distributed computing environment 900 provides the software functionality described herein as a service to the clients 906. It should be understood that the clients 906 can include real or virtual machines including, but not limited to, server computers, web servers, personal computers, tablet computers, gaming consoles, smart televisions, mobile computing entities, smart phones, wearable computers (e.g., the head-mounted device 102), and/or other devices.

Figure 10:
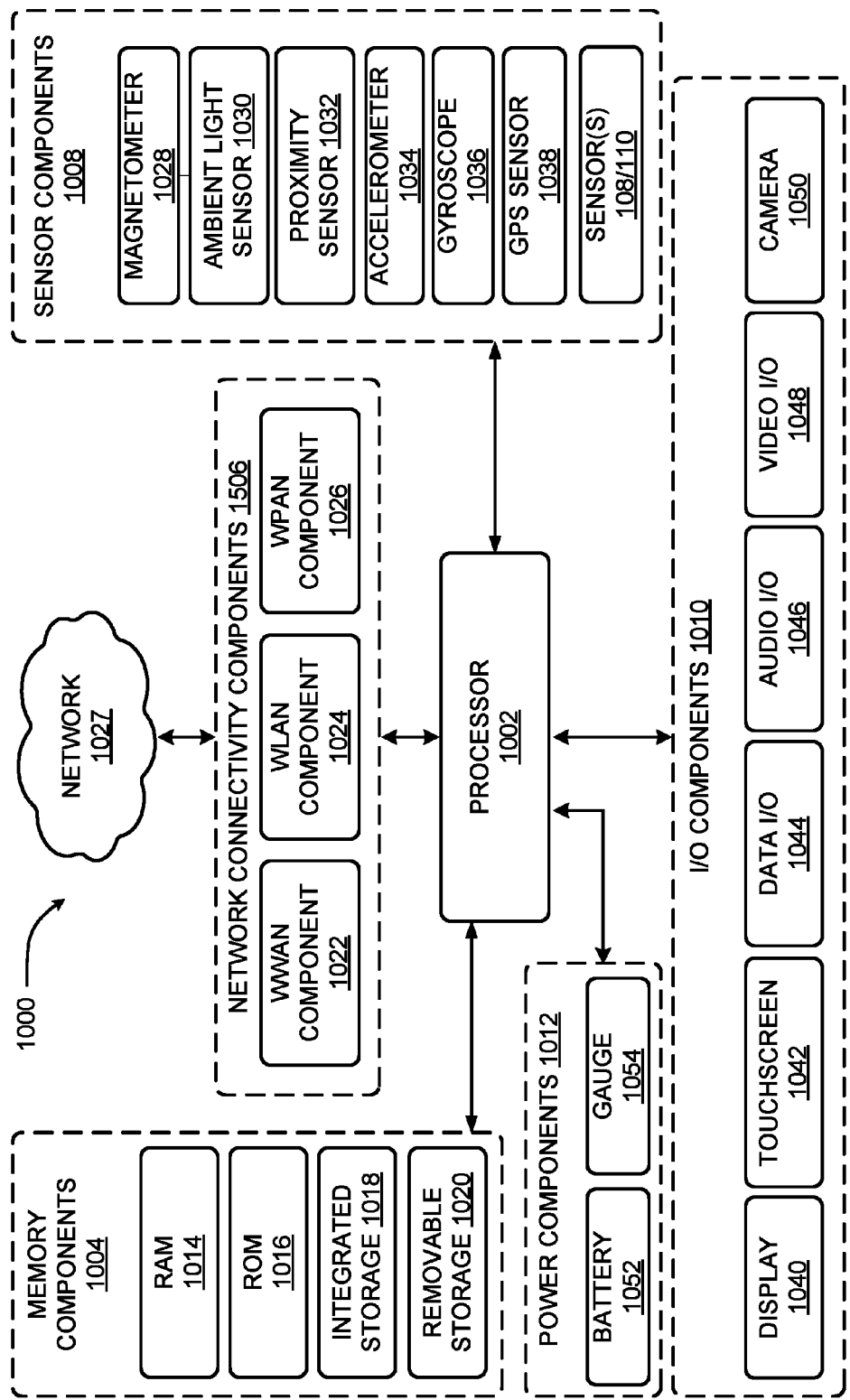
FIG. 10 shows details of another example computing device architecture for a computing device, such as a head-mounted device, capable of executing aspects of the techniques described herein.

FIG. 10 shows details of another example computing device architecture 1000 for a computing device, such as a head-mounted device 102, capable of executing aspects of the techniques described herein. The computing device architecture 1000 is applicable to computing entities that facilitate mobile computing due, in part, to form factor, wireless connectivity, and/or battery-powered operation. In some configurations, the computing entities include, but are not limited to, mobile telephones, tablet devices, slate devices, wearable devices (e.g., the head-mounted device 102), portable video game devices, and the like. Moreover, aspects of the computing device architecture 1000 can be applicable to traditional desktop computers, portable computers (e.g., laptops, notebooks, ultra-portables, and netbooks), server computers, vehicle computers, and other computer systems.

The computing device architecture 1000 illustrated in FIG. 10 includes a processor 1002, memory components 1004, network connectivity components 1006, sensor components 1008, input/output components 1010, and power components 1012. In the illustrated configuration, the processor 1002 is in communication with the memory components 1004, the network connectivity components 1006, the sensor components 1008, the input/output ("I/O") components 1010, and the power components 1012. Although no connections are shown between the individual components illustrated in FIG. 10, the components can interact to carry out device functions. In some configurations, the components are arranged so as to communicate via one or more busses (not shown).

The processor 1002 includes a central processing unit ("CPU") configured to process data, execute computer-executable instructions of one or more applications, and communicate with other components of the computing device architecture 1000 in order to perform various functionality described herein. The processor 1002 can be utilized to execute aspects of the software components presented herein.

In some configurations, the processor 1002 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 1080i, 1080p, and higher resolution), video games, three-dimensional ("3D") modeling applications, and the like. In some configurations, the processor 1002 is configured to communicate with a discrete GPU (not shown). In some examples, the processor 1002 may additionally or alternatively comprise a holographic processing unit (HPU) which is designed specifically to process and integrate data from multiple sensors of a head-mounted computing device and to handle tasks such as spatial correlation (e.g., spatial mapping), gesture recognition, and voice and speech recognition. In any case, the CPU, GPU, and/or HPU can be configured in accordance with a co-processing CPU/GPU/HPU computing model, wherein processing tasks are divided between the CPU, GPU, and/or HPU according to their respective strengths. For instance, the sequential part of an application may execute on the CPU, the computationally-intensive part is accelerated by the GPU, and certain specialized functions (e.g., spatial mapping, gesture recognition, and voice and speech recognition) may executed by an HPU.

In some configurations, the processor 1002 is, or is included in, a System-on-Chip ("SoC") along with one or more of the other components described herein below. For example, the SoC can include the processor 1002, a GPU, one or more of the network connectivity components 1006, and one or more of the sensor components 1008. In some configurations, the processor 1002 is fabricated, in part, utilizing a Package-on-Package ("PoP") integrated circuit packaging technique. The processor 1002 can be a single core or multi-core processor.

The processor 1002 can be created in accordance with an ARM architecture, available for license from ARM HOLDINGS of Cambridge, United Kingdom. Alternatively, the processor 1002 can be created in accordance with an x86 architecture, such as is available from INTEL CORPORATION of Mountain View, Calif. and others. In some configurations, the processor 1002 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 1004 include a random access memory ("RAM") 1014, a read-only memory ("ROM") 1016, an integrated storage memory ("integrated storage") 1018, and a removable storage memory ("removable storage") 1020. In some configurations, the RAM 1014 or a portion thereof, the ROM 1016 or a portion thereof, and/or some combination the RAM 1014 and the ROM 1016 is integrated in the processor 1002. In some configurations, the ROM 1016 is configured to store a firmware, an operating system or a portion thereof (e.g., operating system kernel), and/or a bootloader to load an operating system kernel from the integrated storage 1018 and/or the removable storage 1020.

The integrated storage 1018 can include a solid-state memory, a hard disk, or a combination of solid-state memory and a hard disk. The integrated storage 1018 can be soldered or otherwise connected to a logic board upon which the processor 1002 and other components described herein also can be connected. As such, the integrated storage 1018 is integrated in the computing device. The integrated storage 1018 is configured to store an operating system or portions thereof, application programs, data, and other software components described herein.

The removable storage 1020 can include a solid-state memory, a hard disk, or a combination of solid-state memory and a hard disk. In some configurations, the removable storage 1020 is provided in lieu of the integrated storage 1018. In other configurations, the removable storage 1020 is provided as additional optional storage. In some configurations, the removable storage 1020 is logically combined with the integrated storage 1018 such that the total available storage is made available as a total combined storage capacity. In some configurations, the total combined capacity of the integrated storage 1018 and the removable storage 1020 is shown to a user instead of separate storage capacities for the integrated storage 1018 and the removable storage 1020.

The removable storage 1020 is configured to be inserted into a removable storage memory slot (not shown) or other mechanism by which the removable storage 1020 is inserted and secured to facilitate a connection over which the removable storage 1020 can communicate with other components of the computing device, such as the processor 1002. The removable storage 1020 can be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 1004 can store an operating system. According to various configurations, the operating system includes, but is not limited to, SYMBIAN OS from SYMBIAN LIMITED, WINDOWS MOBILE OS from MICROSOFT CORPORATION of Redmond, Wash., WINDOWS PHONE OS from MICROSOFT CORPORATION, WINDOWS from MICROSOFT CORPORATION, PALM WEBOS from HEWLETT-PACKARD COMPANY of Palo Alto, Calif., BLACKBERRY OS from RESEARCH IN MOTION LIMITED of Waterloo, Ontario, Canada, IOS from APPLE INC. of Cupertino, Calif., and ANDROID OS from GOOGLE INC. of Mountain View, Calif. Other operating systems are also contemplated.

The network connectivity components 1006 include a wireless wide area network component ("WWAN component") 1022, a wireless local area network component ("WLAN component") 1024, and a wireless personal area network component ("WPAN component") 1026. The network connectivity components 1006 facilitate communications to and from the network 1027 or another network, which can be a WWAN, a WLAN, or a WPAN. Although only the network 1027 is illustrated, the network connectivity components 1006 can facilitate simultaneous communication with multiple networks, including the network 1027 of FIG. 10. For example, the network connectivity components 1006 can facilitate simultaneous communications with multiple networks via one or more of a WWAN, a WLAN, or a WPAN. In some examples, the network 1027 can correspond to all or part of network(s) 204, network 828, and/or network 904.

The network 1027 can be or can include a WWAN, such as a mobile telecommunications network utilizing one or more mobile telecommunications technologies to provide voice and/or data services to a computing device utilizing the computing device architecture 1000 via the WWAN component 1022. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 1027 can utilize various channel access methods (which can or cannot be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications can be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 1027 can be configured to provide voice and/or data communications with any combination of the above technologies. The network 1027 can be configured to or adapted to provide voice and/or data communications in accordance with future generation technologies.

In some configurations, the WWAN component 1022 is configured to provide dual-multi-mode connectivity to the network 1027. For example, the WWAN component 1022 can be configured to provide connectivity to the network 1027, wherein the network 1027 provides service via GSM and UMTS technologies, or via some other combination of technologies. Alternatively, multiple WWAN components 1022 can be utilized to perform such functionality, and/or provide additional functionality to support other non-compatible technologies (i.e., incapable of being supported by a single WWAN component). The WWAN component 1022 can facilitate similar connectivity to multiple networks (e.g., a UMTS network and an LTE network).

The network 1027 can be a WLAN operating in accordance with one or more Institute of Electrical and Electronic Engineers ("IEEE") 802.15 standards, such as IEEE 802.15a, 802.15b, 802.15g, 802.15n, and/or future 802.15 standard (referred to herein collectively as Wi-Fi). Draft 802.15 standards are also contemplated. In some configurations, the WLAN is implemented utilizing one or more wireless Wi-Fi access points. In some configurations, one or more of the wireless Wi-Fi access points are another computing device with connectivity to a WWAN that are functioning as a Wi-Fi hotspot. The WLAN component 1024 is configured to connect to the network 1027 via the Wi-Fi access points. Such connections can be secured via various encryption technologies including, but not limited, Wi-Fi Protected Access ("WPA"), WPA2, Wired Equivalent Privacy ("WEP"), and the like.

The network 1027 can be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 1026 is configured to facilitate communications with other devices, such as peripherals, computers, or other computing entities via the WPAN.

In at least one example, the sensor components 1008 can include a magnetometer 1028, an ambient light sensor 1030, a proximity sensor 1032, an accelerometer 1034, a gyroscope 1036, and a Global Positioning System sensor ("GPS sensor") 1038. Additionally, the sensor components 1008 can include any or all of the sensor(s) 108 and/or 110 as described above with reference to FIGS. 1 and 2. It is contemplated that other sensors, such as, but not limited to, temperature sensors or shock detection sensors, strain sensors, moisture sensors also can be incorporated in the computing device architecture 1000.

The magnetometer 1028 is configured to measure the strength and direction of a magnetic field. In some configurations the magnetometer 1028 provides measurements to a compass application program stored within one of the memory components 1004 in order to provide a user with accurate directions in a frame of reference including the cardinal directions, north, south, east, and west. Similar measurements can be provided to a navigation application program that includes a compass component. Other uses of measurements obtained by the magnetometer 1028 are contemplated.

The ambient light sensor 1030 is configured to measure ambient light. In some configurations, the ambient light sensor 1030 provides measurements to an application program stored within one the memory components 1004 in order to automatically adjust the brightness of a display to compensate for low-light and high-light environments. Other uses of measurements obtained by the ambient light sensor 1030 are contemplated.

The proximity sensor 1032 is configured to detect the presence of an object or thing in proximity to the computing device without direct contact. In some configurations, the proximity sensor 1032 detects the presence of a user's body (e.g., the user's face) and provides this information to an application program stored within one of the memory components 1004 that utilizes the proximity information to enable or disable some functionality of the computing device. Other uses of proximity as detected by the proximity sensor 1028 are contemplated.

The accelerometer 1034 is configured to measure proper acceleration. In some configurations, output from the accelerometer 1034 is used by an application program as an input mechanism to control some functionality of the application program. For example, the application program can be a video game in which a character, a portion thereof, or an object is moved or otherwise manipulated in response to input received via the accelerometer 1034. In some configurations, output from the accelerometer 1034 is provided to an application program for use in switching between landscape and portrait modes, calculating coordinate acceleration, or detecting a fall. Other uses of the accelerometer 1034 are contemplated.

The gyroscope 1036 is configured to measure and maintain orientation. In some configurations, output from the gyroscope 1036 is used by an application program as an input mechanism to control some functionality of the application program. For example, the gyroscope 1036 can be used for accurate recognition of movement within a 3D environment of a video game application or some other application. In some configurations, an application program utilizes output from the gyroscope 1036 and the accelerometer 1034 to enhance control of some functionality of the application program. Other uses of the gyroscope 1036 are contemplated.

The GPS sensor 1038, or other position sensing techniques, is configured to receive signals from GPS satellites for use in calculating a location. The location calculated by the GPS sensor 1038 can be used by any application program that requires or benefits from location information. For example, the location calculated by the GPS sensor 1038 can be used with a navigation application program to provide directions from the location to a destination or directions from the destination to the location. Moreover, the GPS sensor 1038 can be used to provide location information to an external location-based service, such as E1515 service. The GPS sensor 1038 can obtain location information generated via WI-FI, WIMAX, and/or cellular triangulation techniques utilizing one or more of the network connectivity components 1006 to aid the GPS sensor 1038 in obtaining a location fix. The GPS sensor 1038 can also be used in Assisted GPS ("A-GPS") systems.

In at least one example, the I/O components 1010 can correspond to input interface(s) and/or output interface(s). The I/O components can include a display 1040, a touchscreen 1042, a data I/O interface component ("data I/O") 1044, an audio I/O interface component ("audio I/O") 15046, a video I/O interface component ("video I/O") 1048, and a camera 1050. In some configurations, the display 1040 and the touchscreen 1042 are combined. In some configurations two or more of the data I/O component 1044, the audio I/O component 1046, and the video I/O component 1048 are combined. The I/O components 1010 can include discrete processors configured to support the various interface described below, or can include processing functionality built-in to the processor 1002.

The display 1040 is an output device configured to present information in a visual form. In particular, the display 1040 can present graphical user interface ("GUI") elements, text, photographs, images, video, notifications, virtual buttons, virtual keyboards, messaging data, Internet content, device status, time, date, calendar data, preferences, map information, location information, and any other information that is capable of being presented in a visual form. In some configurations, the display 1040 is a liquid crystal display ("LCD") utilizing any active or passive matrix technology and any backlighting technology (if used). In some configurations, the display 1040 is an organic light emitting diode ("OLED") display. In some configurations, the display 1040 is a holographic display. Other display types are contemplated.

In at least one example, the display 1040 can correspond to the hardware display surface described above which can be configured to graphically associate holographic user interfaces and other graphical elements with an object seen through the hardware display surface or rendered objects displayed on the hardware display surface.

The touchscreen 1042, also referred to herein as a "touch-enabled screen," is an input device configured to detect the presence and location of a touch. The touchscreen 1042 can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen 1042 is incorporated on top of the display 1040 as a transparent layer to enable a user to use one or more touches to interact with objects or other information presented on the display 1040. In other configurations, the touchscreen 1042 is a touch pad incorporated on a surface of the computing device that does not include the display 1040. For example, the computing device can have a touchscreen incorporated on top of the display 1040 and a touch pad on a surface opposite the display 1040.

In some configurations, the touchscreen 1042 is a single-touch touchscreen. In other configurations, the touchscreen 1042 is a multi-touch touchscreen. In some configurations, the touchscreen 1042 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures can be implemented in software for use with the touchscreen 1042. As such, a developer can create gestures that are specific to a particular application program.

In some configurations, the touchscreen 1042 supports a tap gesture in which a user taps the touchscreen 1042 once on an item presented on the display 1040. The tap gesture can be used to perform various functions including, but not limited to, opening or launching whatever the user taps. In some configurations, the touchscreen 1042 supports a double tap gesture in which a user taps the touchscreen 1042 twice on an item presented on the display 1040. The double tap gesture can be used to perform various functions including, but not limited to, zooming in or zooming out in stages. In some configurations, the touchscreen 1042 supports a tap and hold gesture in which a user taps the touchscreen 1042 and maintains contact for at least a pre-defined time. The tap and hold gesture can be used to perform various functions including, but not limited to, opening a context-specific menu.

In some configurations, the touchscreen 1042 supports a pan gesture in which a user places a finger on the touchscreen 1042 and maintains contact with the touchscreen 1042 while moving the finger on the touchscreen 1042. The pan gesture can be used to perform various functions including, but not limited to, moving through screens, images, or menus at a controlled rate. Multiple finger pan gestures are also contemplated. In some configurations, the touchscreen 1042 supports a flick gesture in which a user swipes a finger in the direction the user wants the screen to move. The flick gesture can be used to perform various functions including, but not limited to, scrolling horizontally or vertically through menus or pages. In some configurations, the touchscreen 1042 supports a pinch and stretch gesture in which a user makes a pinching motion with two fingers (e.g., thumb and forefinger) on the touchscreen 1042 or moves the two fingers apart. The pinch and stretch gesture can be used to perform various functions including, but not limited to, zooming gradually in or out of a website, map, or picture.

Although the above gestures have been described with reference to the use of one or more fingers for performing the gestures, other appendages such as toes or objects such as styluses can be used to interact with the touchscreen 1042. As such, the above gestures should be understood as being illustrative and should not be construed as being limited in any way.

The data I/O interface component 1044 is configured to facilitate input of data to the computing device and output of data from the computing device. In some configurations, the data I/O interface component 1044 includes a connector configured to provide wired connectivity between the computing device and a computer system, for example, for synchronization operation purposes. The connector can be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 1046 is configured to provide audio input and/or output capabilities to the computing device. In some configurations, the audio I/O interface component 1046 includes a microphone configured to collect audio signals. In some configurations, the audio I/O interface component 1046 includes a headphone jack configured to provide connectivity for headphones or other external speakers. In some configurations, the audio I/O interface component 1046 includes a speaker for the output of audio signals. In some configurations, the audio I/O interface component 1046 includes an optical audio cable out.

The video I/O interface component 1048 is configured to provide video input and/or output capabilities to the computing device. In some configurations, the video I/O interface component 1048 includes a video connector configured to receive video as input from another device (e.g., a video media player such as a DVD or BLURAY player) or send video as output to another device (e.g., a monitor, a television, or some other external display). In some configurations, the video I/O interface component 1048 includes a High-Definition Multimedia Interface ("HDMI"), mini-HDMI, micro-HDMI, DisplayPort, or proprietary connector to input/output video content. In some configurations, the video I/O interface component 1048 or portions thereof is combined with the audio I/O interface component 1046 or portions thereof.

The camera 1050 can be configured to capture still images and/or video. The camera 1050 can utilize a charge coupled device ("CCD") or a complementary metal oxide semiconductor ("CMOS") image sensor to capture images. In some configurations, the camera 1050 includes a flash to aid in taking pictures in low-light environments. Settings for the camera 1050 can be implemented as hardware or software buttons. Images and/or video captured by camera 1050 may additionally or alternatively be used to detect non-touch gestures, facial expressions, eye movement, or other movements and/or characteristics of the user.

Although not illustrated, one or more hardware buttons can also be included in the computing device architecture 1000. The hardware buttons can be used for controlling some operational aspect of the computing device. The hardware buttons can be dedicated buttons or multi-use buttons. The hardware buttons can be mechanical or sensor-based.

The illustrated power components 1012 include one or more batteries 1052, which can be connected to a battery gauge 1054. The batteries 1052 can be rechargeable or disposable. Rechargeable battery types include, but are not limited to, lithium polymer, lithium ion, nickel cadmium, and nickel metal hydride. Each of the batteries 1052 can be made of one or more cells.

The battery gauge 1054 can be configured to measure battery parameters such as current, voltage, and temperature. In some configurations, the battery gauge 1054 is configured to measure the effect of a battery's discharge rate, temperature, age and other factors to predict remaining life within a certain percentage of error. In some configurations, the battery gauge 1054 provides measurements to an application program that is configured to utilize the measurements to present useful power management data to a user. Power management data can include one or more of a percentage of battery used, a percentage of battery remaining, a battery condition, a remaining time, a remaining capacity (e.g., in watt hours), a current draw, and a voltage.

The power components 1012 can also include a power connector, which can be combined with one or more of the aforementioned I/O components 1010. The power components 1012 can interface with an external power system or charging equipment via a power I/O component.

EXAMPLE CLAUSES

Example clause A, a device comprising: a display configured to present virtual content; an interface communicatively coupled to an input mechanism that is configured to collect data associated with motion of the input mechanism; one or more processors communicatively coupled to the display; and memory having computer-executable instructions stored thereon which, when executed by the one or more processors, cause the device to perform operations comprising: receiving, via the interface and from the input mechanism, first data associated with first motion of the input mechanism; analyzing the first data associated with the first motion of the input mechanism to determine at least part of a range of motion of the input mechanism; determining a restricted area of the display, wherein the restricted area comprises a portion of a display area and an interaction with a virtual object presented in the restricted area is limited by the range of motion of the input mechanism; adjusting a parameter that correlates an amount of motion of the input mechanism to an amount of motion of a virtual element presented by the display; receiving, via the interface and from the input mechanism, second data associated with second motion of the input mechanism; and controlling, using the adjusted parameter and based on the second data associated with the second motion of the input mechanism, the virtual element presented by the display to perform the interaction with the virtual object presented in the restricted area of the display.

Example clause B, the device of Example clause A, wherein: the second motion of the input mechanism occurs within a first three-dimensional coordinate space; correlated motion of the virtual element occurs within a second three-dimensional coordinate space that is larger than the first three-dimensional coordinate space; and the operations further comprise converting, using the adjusted parameter, the second motion of the input mechanism that occurs within the first three-dimensional coordinate space into the correlated motion of the virtual element that occurs within the second three-dimensional coordinate space.

Example clause C, the device of Example clause B, wherein the adjusting the parameter increases the amount of motion of the virtual element within the second three-dimensional coordinate space relative to the amount of motion of the input mechanism within the first three-dimensional coordinate space.

Example clause D, the device of Example clause B or Example clause C, wherein: the first three-dimensional coordinate space is associated with three-dimensional space within reach of an arm and a hand of a user; the second three-dimensional coordinate space is associated with three-dimensional space within a view of the user; and the restricted area is limited by the range of motion of the input mechanism due to a detected impossibility or a detected difficulty for the user to move the input mechanism to a position in the first three-dimensional coordinate space that corresponds to a position within the restricted area of the second three-dimensional coordinate space.

Example clause E, the device of Example clause D, wherein the display comprises a transparent display that presents virtual content in association with real-world content within the view of the user.

Example clause F, the device of any one of Example clauses A through E, wherein: the analyzing reveals that the first motion of the input mechanism is indicative of a number of repeated attempts to perform a same interaction between the virtual element and another virtual object presented by the display; and the operations further comprise: determining that the number of repeated attempts exceeds a threshold number of attempts; and determining that the restricted area is limited by the range of motion of the input mechanism based at least in part on the determining that the number of repeated attempts exceeds the threshold number of attempts.

Example clause G, the device of any one of Example clauses A through E, wherein: the analyzing reveals that the first motion of the input mechanism is associated with a period of time during which a user is attempting to perform an individual interaction; and the operations further comprise: determining that the period of time exceeds a threshold period of time; and determining that the restricted area is limited by the range of motion of the input mechanism based at least in part on the determining that the period of time exceeds the threshold period of time.

Example clause H, the device of any one of Example clauses A through G, wherein the data associated with the motion of the input mechanism comprises a change in position of the input mechanism over time.

Example clause I, the device of any one of Example clauses A through H, wherein the virtual element comprises at least one of a cursor element or a pointer element.

Example clause J, the device of any one of Example clauses A through I, wherein: the input mechanism is further configured to collect data associated with rotation of the input mechanism, the data associated with the rotation of the input mechanism comprising a change in orientation of the input mechanism; and the operations further comprise: receiving, via the interface and from the input mechanism, third data associated with rotation of the input mechanism; analyzing the third data associated with the rotation of the input mechanism to determine at least part of a range of rotation of the input mechanism; and adjusting, based at least in part on the range of rotation, another parameter that increases an amount of rotation of the input mechanism relative to an amount of rotation of the virtual element presented by the display.

While Example clauses A through J are provided above with respect to a device, it is understood in the context of this document that the subject matter of Example clauses A through J can be implemented via a system, a method, and/or via instructions stored on computer readable storage media.

Example clause K, a device comprising: an interface communicatively coupled to an input mechanism that is configured to collect data associated with motion of the input mechanism within a first three-dimensional coordinate space; a display configured to present virtual content within a second three-dimensional coordinate space that is different than the first three-dimensional coordinate space; one or more sensors configured to sense data indicative of a location of a physical object within the first three-dimensional coordinate space; one or more processors communicatively coupled to the display; and memory having computer-executable instructions stored thereon which, when executed by the one or more processors, cause the device to perform operations comprising: determining, based at least in part on the location of the physical object, a range of motion of the input mechanism within the first three-dimensional coordinate space; determining a restricted area of the display, wherein the restricted area comprises a portion of a display area and an interaction with a virtual object presented in the restricted area is limited by the range of motion of the input mechanism; adjusting a parameter that correlates an amount of motion of the input mechanism to an amount of motion of a virtual element presented by the display; receiving, via the interface and from the input mechanism, the data associated with the motion of the input mechanism; and controlling, using the adjusted parameter and based on the data associated with the motion of the input mechanism, the virtual element presented by the display to perform the interaction with the virtual object presented in the restricted area of the display.

Example clause L, the device of Example clause K, wherein the adjusting the parameter increases the amount of motion of the virtual element within the second three-dimensional coordinate space relative to the amount of motion of the input mechanism within the first three-dimensional coordinate space.

Example clause M, the device of Example clause L, wherein: the first three-dimensional coordinate space is associated with three-dimensional space within reach of an arm and a hand of a user; the second three-dimensional coordinate space is associated with three-dimensional space within a view of the user; and the display comprises a transparent display that presents virtual content in association with real-world content within the view of the user.

While Example clauses K through M are provided above with respect to a device, it is understood in the context of this document that the subject matter of Example clauses K through M can be implemented via a system, a method, and/or via instructions stored on computer readable storage media.

Example clause N, a device comprising: an interface communicatively coupled to an input mechanism that is configured to collect data associated with motion of the input mechanism within a first three-dimensional coordinate space; a display configured to present virtual objects within a second three-dimensional coordinate space; one or more processors communicatively coupled to the display; and memory having computer-executable instructions stored thereon which, when executed by the one or more processors, cause the device to perform operations comprising: receiving, via the interface and from the input mechanism, the data associated with the motion of the input mechanism; building, based at least in part on the data associated with the motion of the input mechanism, a model of a range of motion of the input mechanism within the first three-dimensional coordinate space; and mapping the range of motion of the input mechanism within the first three-dimensional coordinate space to the second three dimensional coordinate space to define, for the second three-dimensional coordinate space: an interaction area within which a first interaction with a first virtual object based on the motion of the input mechanism is not limited by the range of motion of the input mechanism; and a restricted area within which a second interaction with a second virtual object based on the motion of the input mechanism is limited by the range of motion of the input mechanism.

Example clause O, the device of Example clause N, wherein the operations further comprise: analyzing the data associated with the motion of the input mechanism; determining that the data indicates a number of repeated attempts to perform the second interaction with the second virtual object; determining that the number of repeated attempts exceeds a threshold number of attempts; and determining that a restriction limits an ability to use the input mechanism to perform the second interaction with the second virtual object based at least in part on the determining that the number of repeated attempts exceeds the threshold number of attempts.

Example clause P, the device of Example clause N, wherein the operations further comprise: analyzing the data associated with the motion of the input mechanism; determining that the data associated with the motion of the input mechanism is associated with a period of time during which a user is attempting to perform the second interaction with the second virtual object; determining that the period of time exceeds a threshold period of time; and determining that a restriction limits an ability to use the input mechanism to perform the second interaction with the second virtual object based at least in part on the determining that the period of time exceeds the threshold period of time.

Example clause Q, the device of any one of Example clauses N through P, wherein the operations further comprise adjusting a parameter to increase an amount of motion of a virtual element within the second three-dimensional coordinate space that correlates to an amount of motion of the input mechanism in the first three-dimensional space so that the second interaction with the second virtual object based on the motion of the input mechanism is no longer limited by the range of motion of the input mechanism.

Example clause R, the device of Example clause Q, wherein the operations comprise: storing the adjusted parameter in an interaction profile associated with a particular location of a user; determining that the user has returned to the particular location at a later time; and activating the interaction profile to enable subsequent interactions using the adjusted parameter.

Example clause S, the device of any one of Example clauses N through P, wherein the operations further comprise one of: re-positioning the second virtual object from the restricted area into the interaction area; or causing additional virtual objects to be presented in the interaction area and not the restricted area.

Example clause T, the device of any one of Example clauses N through S, wherein: the first three-dimensional coordinate space is associated with three-dimensional space within reach of an arm and a hand of a user; the second three-dimensional coordinate space is associated with three-dimensional space within a view of the user; and the display comprises a transparent display that presents virtual content in association with real-world content within the view of the user.

While Example clauses N through T are provided above with respect to a device, it is understood in the context of this document that the subject matter of Example clauses N through T can be implemented via a system, a method, and/or via instructions stored on computer readable storage media.

Example clause U, a device comprising: means for displaying virtual content; means for receiving, from an input mechanism, first data associated with first motion of the input mechanism and second data associated with second motion of the input mechanism; means for analyzing the first data associated with the first motion of the input mechanism to determine at least part of a range of motion of the input mechanism; means for determining a restricted area of the means for displaying, wherein the restricted area comprises a portion of a display area and an interaction with a virtual object presented in the restricted area is limited by the range of motion of the input mechanism; means for adjusting a parameter that correlates an amount of motion of the input mechanism to an amount of motion of a virtual element presented by the means for displaying; and means for controlling, using the adjusted parameter and based on the second data associated with the second motion of the input mechanism, the virtual element presented by the means for displaying to perform the interaction with the virtual object presented in the restricted area of the means for displaying.

Example clause V, a device comprising: means for receiving data associated with motion of an input mechanism within a first three-dimensional coordinate space; means for displaying virtual content within a second three-dimensional coordinate space that is different than the first three-dimensional coordinate space; means for sensing data indicative of a location of a physical object within the first three-dimensional coordinate space; means for determining, based at least in part on the location of the physical object, a range of motion of the input mechanism within the first three-dimensional coordinate space; means for determining a restricted area of the means for displaying, wherein the restricted area comprises a portion of a display area and an interaction with a virtual object presented in the restricted area is limited by the range of motion of the input mechanism; means for adjusting a parameter that correlates an amount of motion of the input mechanism to an amount of motion of a virtual element presented by the display; and means for controlling, using the adjusted parameter and based on the data associated with the motion of the input mechanism, the virtual element presented by the means for displaying to perform the interaction with the virtual object presented in the restricted area of the means for displaying.

Example clause W, a device comprising: means for receiving data associated with motion of an input mechanism within a first three-dimensional coordinate space; means for displaying virtual objects within a second three-dimensional coordinate space; means for building, based at least in part on the data associated with the motion of the input mechanism, a model of a range of motion of the input mechanism within the first three-dimensional coordinate space; and means for mapping the range of motion of the input mechanism within the first three-dimensional coordinate space to the second three-dimensional coordinate space to define, for the second three-dimensional coordinate space: an interaction area of the means for displaying within which a first interaction with a first virtual object based on the motion of the input mechanism is not limited by the range of motion of the input mechanism; and a restricted area of the means for displaying within which a second interaction with a second virtual object based on the motion of the input mechanism is limited by the range of motion of the input mechanism.

Although the subject matter has been described in language specific to structural features and/or methodological acts, it is to be understood that the subject matter defined in the appended claims is not necessarily limited to the specific features or acts described. Rather, the specific features and acts are described as illustrative forms of implementing the claims.

Conditional language such as, among others, "can," "could," "might" or "can," unless specifically stated otherwise, are understood within the context to present that certain examples include, while other examples do not necessarily include, certain features, elements and/or steps. Thus, such conditional language is not generally intended to imply that certain features, elements and/or steps are in any way required for one or more examples or that one or more examples necessarily include logic for deciding, with or without input or prompting, whether certain features, elements and/or steps are included or are to be performed in any particular example. Conjunctive language such as the phrase "at least one of X, Y or Z," unless specifically stated otherwise, is to be understood to present that an item, term, etc. can be either X, Y, or Z, or a combination thereof.

What is claimed is:

1. A device comprising:
   a display configured to present virtual content;
   an interface communicatively coupled to an input mechanism that is configured to collect data associated with motion of the input mechanism based on a current location of a user, wherein the motion of the input mechanism occurs within a first three-dimensional coordinate space;
   one or more processors communicatively coupled to the display; and
   memory having computer-executable instructions stored thereon which, when executed by the one or more processors, cause the device to perform operations comprising:
   receiving, via the interface and from the input mechanism, first data associated with first motion of the input mechanism that occurs within the first three-dimensional coordinate space;
   determining a location of a physical object that restricts the first motion of the input mechanism based at least in part on the current location of the user;
   analyzing the first data associated with the first motion of the input mechanism and the location of the physical object to determine at least part of a range of motion of the input mechanism;
   determining a restricted area of the display, wherein the restricted area comprises a portion of a display area and an interaction with a virtual object presented in the restricted area is limited by the range of motion of the input mechanism;
   adjusting, based at least in part on the restricted area of the display, a parameter that correlates an amount of motion of the input mechanism to an amount of motion of a virtual element presented by the display, wherein the motion of the virtual element occurs within a second three-dimensional coordinate space that is larger than the first three-dimensional coordinate space;
   receiving, via the interface and from the input mechanism, second data associated with second motion of the input mechanism that occurs within the first three-dimensional coordinate space; and
   converting, using the adjusted parameter, the second motion of the input mechanism that occurs within the first three-dimensional coordinate space into correlated motion of the virtual element that occurs within the second three-dimensional coordinate space,
   wherein the correlated motion enables performance of the interaction with the virtual object presented in the restricted area of the display.

2. The device of claim 1, wherein the adjusting the parameter increases the amount of motion of the virtual element within the second three-dimensional coordinate space relative to the amount of motion of the input mechanism within the first three-dimensional coordinate space.

3. The device of claim 1, wherein:
   the first three-dimensional coordinate space is associated with three-dimensional space within reach of an arm and a hand of the user;
   the second three-dimensional coordinate space is associated with three-dimensional space within a view of the user; and
   the restricted area is further limited by the range of motion of the input mechanism due to a detected impossibility or a detected difficulty for the user to move the input mechanism to a position in the first three-dimensional coordinate space that corresponds to a position within the restricted area of the second three-dimensional coordinate space.

4. The device of claim 1, wherein the display comprises a transparent display that presents virtual content in association with real-world content within a view of the user.

5. The device of claim 1, wherein:
   the analyzing reveals that the first motion of the input mechanism is indicative of a number of repeated attempts to perform a same interaction between (i) the virtual element and (ii) the virtual object or another virtual object presented by the display; and
   the operations further comprise:
   determining that the number of repeated attempts exceeds a threshold number of attempts; and
   determining that the restricted area is limited by the range of motion of the input mechanism based at least in part on the determining that the number of repeated attempts exceeds the threshold number of attempts.

6. The device of claim 1, wherein:
the analyzing reveals that the first motion of the input mechanism is associated with a period of time during which the user is attempting to perform an individual interaction; and
the operations further comprise:
determining that the period of time exceeds a threshold period of time; and
determining that the restricted area is limited by the range of motion of the input mechanism based at least in part on the determining that the period of time exceeds the threshold period of time.

7. The device of claim 1, wherein the data associated with the motion of the input mechanism comprises a change in position of the input mechanism over time.

8. The device of claim 1, wherein the virtual element comprises at least one of a cursor element or a pointer element.

9. The device of claim 1, wherein:
the input mechanism is further configured to collect data associated with rotation of the input mechanism, the data associated with the rotation of the input mechanism comprising a change in orientation of the input mechanism; and
the operations further comprise:
receiving, via the interface and from the input mechanism, third data associated with rotation of the input mechanism;
analyzing the third data associated with the rotation of the input mechanism to determine at least part of a range of rotation of the input mechanism; and
adjusting, based at least in part on the range of rotation, another parameter that increases an amount of rotation of the input mechanism relative to an amount of rotation of the virtual element presented by the display.

10. A device comprising:
one or more sensors configured to sense data associated with motion of an input mechanism within a first three-dimensional coordinate space and to sense data indicative of a location of a physical object within the first three-dimensional coordinate space relative to a current location of a user;
a display configured to present virtual content within a second three-dimensional coordinate space that is larger than the first three-dimensional coordinate space;
one or more processors communicatively coupled to the display; and
memory having computer-executable instructions stored thereon which, when executed by the one or more processors, cause the device to perform operations comprising:
determining a range of motion of the input mechanism within the first three-dimensional coordinate space that is limited by the location of the physical object relative to the current location of the user;
determining a restricted area of the display, wherein the restricted area comprises a portion of a display area and an interaction with a virtual object presented in the restricted area is limited by the range of motion of the input mechanism;
adjusting, based at least in part on the restricted area of the display, a parameter that correlates an amount of motion of the input mechanism within the first three-dimensional coordinate space to an amount of motion of a virtual element presented by the display within the second three-dimensional coordinate space;
receiving the data associated with the motion of the input mechanism; and
converting, using the adjusted parameter, the motion of the input mechanism within the first three-dimensional coordinate space into correlated motion of the virtual element within the second three-dimensional coordinate space, wherein the correlated motion enables performance of the interaction with the virtual object presented in the restricted area of the display.

11. The device of claim 10, wherein the adjusting the parameter increases the amount of motion of the virtual element within the second three-dimensional coordinate space relative to the amount of motion of the input mechanism within the first three-dimensional coordinate space.

12. The device of claim 11, wherein:
the first three-dimensional coordinate space is associated with three-dimensional space within reach of an arm and a hand of the user;
the second three-dimensional coordinate space is associated with three-dimensional space within a view of the user; and
the display comprises a transparent display that presents virtual content in association with real-world content within the view of the user.

13. A device comprising:
an interface communicatively coupled to an input mechanism that is configured to collect data associated with motion of the input mechanism within a first three-dimensional coordinate space;
a display configured to present virtual objects within a second three-dimensional coordinate space that is larger than the first three-dimensional coordinate space;
one or more processors communicatively coupled to the display; and
memory having computer-executable instructions stored thereon which, when executed by the one or more processors, cause the device to perform operations comprising:
receiving, via the interface and from the input mechanism, the data associated with the motion of the input mechanism;
determining a location of a physical object, relative to a current location of a user, that restricts the motion of the input mechanism;
building, based at least in part on the data associated with the motion of the input mechanism and the location of the physical object, a model of a range of motion of the input mechanism within the first three-dimensional coordinate space; and
mapping the range of motion of the input mechanism within the first three-dimensional coordinate space to the second three-dimensional coordinate space to define, for the second three-dimensional coordinate space:
an interaction area within which a first interaction with a first virtual object based on the motion of the input mechanism is not limited by the range of motion of the input mechanism; and
a restricted area within which a second interaction with a second virtual object based on the motion of the input mechanism is limited by the range of motion of the input mechanism; and
adjusting a parameter to increase an amount of motion of a virtual element within the second three-dimensional coordinate space that correlates to an amount of motion of the input mechanism in the first three-dimensional space so that the second interaction with the second virtual object based on the motion of the input mechanism is no longer limited by the range of motion of the input mechanism.

14. The device of claim 13, wherein the operations further comprise:
analyzing the data associated with the motion of the input mechanism;
determining that the data indicates a number of repeated attempts to perform the second interaction with the second virtual object;
determining that the number of repeated attempts exceeds a threshold number of attempts; and
determining that a restriction limits an ability to use the input mechanism to perform the second interaction with the second virtual object based at least in part on the determining that the number of repeated attempts exceeds the threshold number of attempts.

15. The device of claim 13, wherein the operations further comprise:
analyzing the data associated with the motion of the input mechanism;
determining that the data associated with the motion of the input mechanism is associated with a period of time during which the user is attempting to perform the second interaction with the second virtual object;
determining that the period of time exceeds a threshold period of time; and
determining that a restriction limits an ability to use the input mechanism to perform the second interaction with the second virtual object based at least in part on the determining that the period of time exceeds the threshold period of time.

16. The device of claim 13, the operations comprise:
storing the adjusted parameter in an interaction profile associated with the current location of the user;
determining that the user has returned to the current location at a later time; and
activating the interaction profile to enable subsequent interactions using the adjusted parameter.

17. The device of claim 13, wherein the operations further comprise one of:
re-positioning the second virtual object from the restricted area into the interaction area; or
causing additional virtual objects to be presented in the interaction area and not the restricted area.

18. The device of claim 13, wherein:
the first three-dimensional coordinate space is associated with three-dimensional space within reach of an arm and a hand of the user;
the second three-dimensional coordinate space is associated with three-dimensional space within a view of the user; and
the display comprises a transparent display that presents virtual content in association with real-world content within the view of the user.

* * * * *